US012425097B2

United States Patent
Handley et al.

(10) Patent No.: US 12,425,097 B2
(45) Date of Patent: Sep. 23, 2025

(54) ADAPTIVE MOBILE DISTRIBUTION OF DATA AMONG A FLEET OF UNCREWED VEHICLES

(71) Applicant: Wing Aviation LLC, Mountain View, CA (US)

(72) Inventors: Alex Handley, Santa Clara, CA (US); Daniel Peirano, Sunnyvale, CA (US); Jonathan Lesser, Oakland, CA (US); André Prager, Sunnyvale, CA (US)

(73) Assignee: Wing Aviation LLC, Palo Alto, CA (US)

( * ) Notice: Subject to any disclaimer, the term of this patent is extended or adjusted under 35 U.S.C. 154(b) by 416 days.

(21) Appl. No.: 17/982,783

(22) Filed: Nov. 8, 2022

(65) Prior Publication Data

US 2024/0154689 A1    May 9, 2024

(51) Int. Cl.
*H04B 7/185*    (2006.01)
*H04W 76/10*    (2018.01)
*H04W 84/12*    (2009.01)

(52) U.S. Cl.
CPC ........ *H04B 7/18504* (2013.01); *H04W 76/10* (2018.02); *H04W 84/12* (2013.01)

(58) Field of Classification Search
CPC ............ H04B 7/18502; H04B 7/18504; H04B 7/18563; H04W 76/10; H04W 84/02; H04W 84/12; H04W 88/02; H04W 88/08; H04W 88/10; H04W 92/02
See application file for complete search history.

(56) References Cited

U.S. PATENT DOCUMENTS 9,778,653 B1 * 10/2017 McClintock ........... G06Q 10/08
9,848,459 B2    12/2017 Darrow et al.
9,894,327 B1    2/2018 Jacob
(Continued)

FOREIGN PATENT DOCUMENTS

CN    111683375 B    7/2021

OTHER PUBLICATIONS

Nunns, Gareth J., et al., "Autonomous Flying Wifi Access Point", figshare, IEEE, https://hdl.handle.net/2134/37759 Autonomous flying WiFi access point; 2020, 7 pp.
(Continued)

*Primary Examiner* — Alpus Hsu
(74) *Attorney, Agent, or Firm* — McDonnell Boehnen Hulbert & Berghoff LLP

(57) ABSTRACT

An example method carried out by an uncrewed vehicle (UV) is disclosed. The method may involve establishing a wireless cellular connection with a wireless cellular network via a wireless cellular communications interface of the UV. The wireless cellular network may be communicatively connected with one or more data servers via a data backhaul network. The example method may further involve exchanging operational data between the one or more data servers and a data storage device of the UV via the wireless cellular connection with the wireless cellular network, establishing a wireless local area network (WLAN) network connection with one or more uncrewed aerial vehicles (UAVs) via a WLAN communications interface of the UV, and exchanging the operational data between the data storage device and at least one of the one or more UAVs over the WLAN network connection.

20 Claims, 11 Drawing Sheets

(56) References Cited

U.S. PATENT DOCUMENTS

| | | | | |
|---|---|---|---|---|
| 9,948,380 | B1* | 4/2018 | Vos | H04B 7/18506 |
| 9,996,079 | B2* | 6/2018 | Magy | H04B 17/27 |
| 10,277,307 | B1* | 4/2019 | Vos | H04B 7/18504 |
| 2016/0309337 | A1* | 10/2016 | Priest | H04W 24/02 |
| 2018/0189369 | A1 | 7/2018 | Baek et al. | |
| 2020/0334460 | A1* | 10/2020 | Ross | G06V 20/52 |
| 2020/0380872 | A1* | 12/2020 | Hong | H04B 7/18506 |
| 2021/0075500 | A1 | 3/2021 | Vos et al. | |
| 2021/0211185 | A1* | 7/2021 | Hong | G05D 1/0022 |
| 2022/0019971 | A1* | 1/2022 | Tazume | G08G 5/55 |
| 2022/0066769 | A1 | 3/2022 | Lo | |
| 2023/0298471 | A1* | 9/2023 | Viswanathan | G08G 5/30 |
| | | | | 701/3 |

OTHER PUBLICATIONS

Antonio Guillen-Perez, et al., "WiFi Networks on Drones", Dept. of Information Technologies and Communications, ITU Kaleidoscope Academic Conference, 2016, 9 pp, Universidad Politecnica de Cartagena, Cartagena, Spain.

International Searching Authority, International Search Report and Written Opinion mailed on Mar. 7, 2024, issued in connection with International Patent Application No. PCT/2023/078828, filed Nov. 6, 2023, 12 pages.

Stateczny et al., "Wireless Local Area Network Technologies as Communication Solutions for Unmanned Surface Vehicles," Sensors, MDPI, Jan. 15, 2022, 30 pages, vol. 22, No. 655.

\* cited by examiner

ADAPTIVE MOBILE DISTRIBUTION OF DATA AMONG A FLEET OF UNCREWED VEHICLES

BACKGROUND

An uncrewed vehicle, which may also be referred to as an autonomous vehicle, is a vehicle capable of travel without a physically-present human operator. An uncrewed vehicle may operate in a remote-control mode, in an autonomous mode, or in a partially autonomous mode. The term "unmanned" may sometimes be used instead of, or in addition to, "uncrewed," and it should be understood that both terms have the same meaning, and may be used interchangeably.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation waypoints, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples include quad-copters and tail-sitter uncrewed aerial vehicles (UAVs), among others. Uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

Examples disclosed herein include systems and methods involving UAVs having specialized functionality for support of a group of UAVs, such as a fleet. The UAVs of a fleet may operate to carry out one or more categories of tasks, such as delivery of items to customers. From time to time during task operations, UAVs may need to engage in various types of maintenance and/or management operations. Non-limiting examples may include recharging onboard batteries, uploading operations reporting data (e.g., logs), and downloading operations configuration data (e.g., software updates, machine learning models, navigational data updates, and mission specifications). While battery-charging "stations" may be widely and numerously deployed and operated at relatively low cost to a fleet operator, correspondingly large scale deployment of stations with broadband and/or other network connections to facilitate upload and download data transfers for a large fleet of UAVs may incur non-negligible financial and operational costs.

Accordingly, certain UAVs of a fleet may have, or be selected to implement, specialized functionality to act as a sort of "data ferry" in order to collect (e.g., upload) data from other fleet UAVs, and/or deliver (e.g., download) data to other fleet UAVs. From time to time, the data ferry may communicate with UAVs of the fleet via, e.g., an "opportunistic" (e.g., temporary and/or ad hoc) wireless local area network (e.g., WIFI) in order to carry out upload/download data transfers. And from time to time, the data ferry may upload data to and/or download data from network servers by communicating with the network servers via a relatively small number of stations with broadband interfaces, and thereby significantly reduce communication costs that might otherwise be incurred. This is just one example of a type of specialized functionality that may be implemented on certain UAVs of a fleet or other operational group.

In a first aspect, an uncrewed aerial vehicle (UAV) may comprise a wireless local area network (WLAN) communications interface, a wireless cellular communications interface, a data storage device, and a control system. The control system may be configured to: establish a wireless cellular connection with a wireless cellular network via the wireless cellular communications interface, wherein the wireless cellular network is communicatively connected with one or more data servers via a data backhaul network; exchange operational data between the one or more data servers and the data storage device via the wireless cellular connection with the wireless cellular network; establish a WLAN network connection with one or more uncrewed aerial vehicles (UAVs) via the WLAN communications interface; and exchange the operational data between the data storage device and at least one of the one or more UAVs over the WLAN network connection.

In a second aspect, an uncrewed vehicle (UV) may comprise a wireless local area network (WLAN) communications interface, and a control system. The control system may be configured to establish a WLAN network connection with one or more other UVs via the WLAN communications interface; and exchange UV operations configuration data with at least one of the one or more other UVs over the WLAN network connection.

In a third aspect, a method carried out by an uncrewed vehicle (UV) may comprise: establishing a wireless cellular connection with a wireless cellular network via a wireless cellular communications interface of the UV, the wireless cellular network being communicatively connected with one or more data servers via a data backhaul network; exchanging operational data between the one or more data servers and a data storage device of the UV via the wireless cellular connection with the wireless cellular network; establishing a wireless local area network (WLAN) network connection with one or more uncrewed aerial vehicles (UAVs) via a WLAN communications interface of the UV; and exchanging the operational data between the data storage device and at least one of the one or more UAVs over the WLAN network connection.

In a fourth aspect, a non-transitory computer-readable medium may store instructions that, when executed by one or more processors of a control system of an uncrewed vehicle (UV), may cause the control system to carry out operations including: establishing a wireless cellular connection with a wireless cellular network via a wireless cellular communications interface of the UV, the wireless cellular network being communicatively connected with one or more data servers via a data backhaul network; exchanging operational data between the one or more data servers and a data storage device of the UV via the wireless cellular connection with the wireless cellular network; establishing a wireless local area network (WLAN) network connection with one or more uncrewed aerial vehicles (UAVs) via a WLAN communications interface of the UV; and exchanging the operational data between the data storage device and at least one of the one or more UAVs over the WLAN network connection.

In a fifth aspect, a system is provided that includes means for an uncrewed aerial vehicle (UV) to carry out operations including: establishing a wireless cellular connection with a wireless cellular network via a wireless cellular communications interface of the UV, the wireless cellular network being communicatively connected with one or more data servers via a data backhaul network; exchanging operational data between the one or more data servers and a data storage device of the UV via the wireless cellular connection with the wireless cellular network; establishing a wireless local area network (WLAN) network connection with one or more uncrewed aerial vehicles (UAVs) via a WLAN communications interface of the UV; and exchanging the operational data between the data storage device and at least one of the one or more UAVs over the WLAN network connection.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
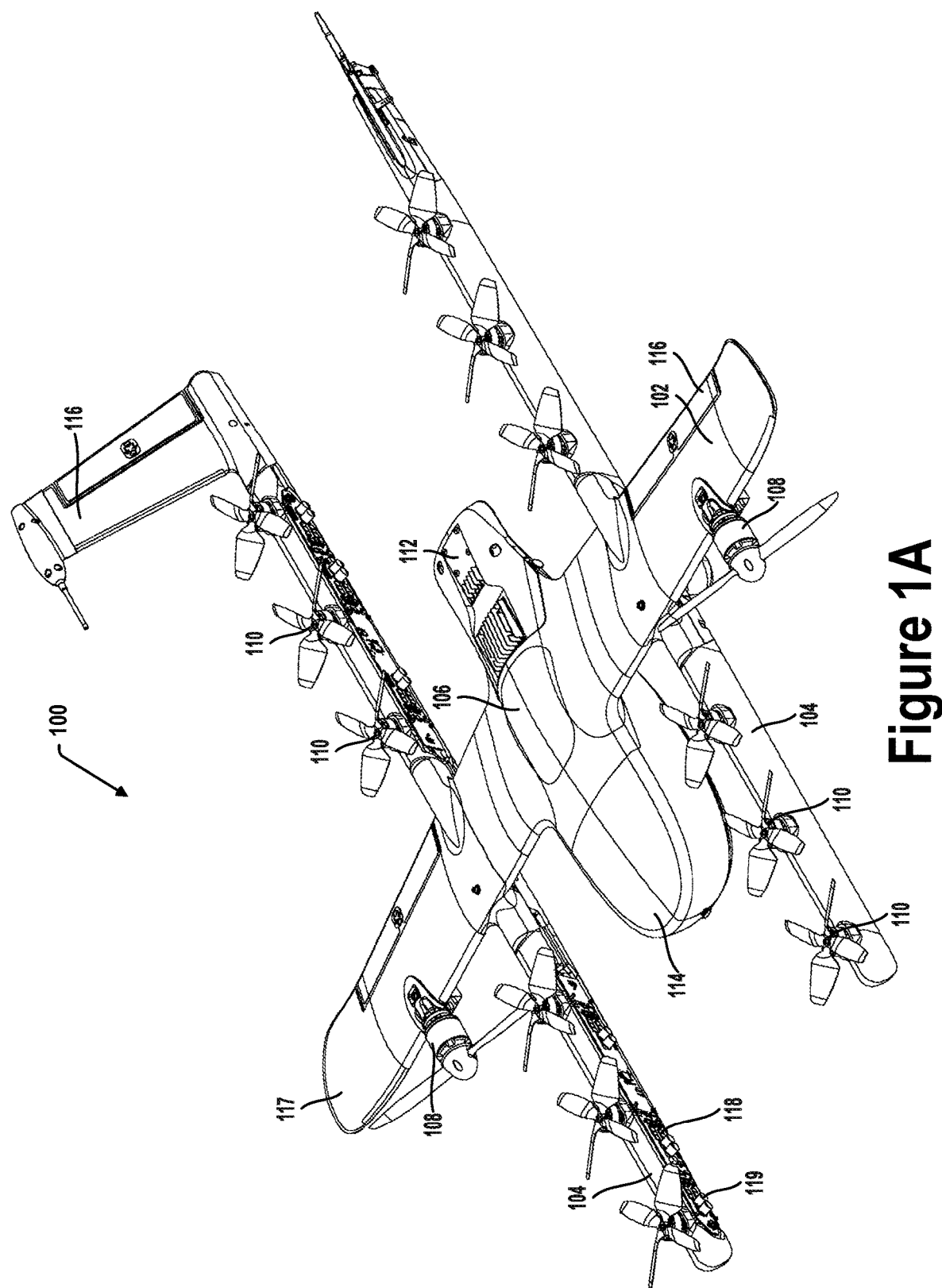
FIG. 1A is a simplified illustration of an uncrewed aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

An example usage of UAVs may be to deliver various items to customers. For example, UAVs may be tasked with picking up a payload containing an item from a location and delivering the payload to a customer's residence, commercial building, or other location. In a typical usage scenario a group or fleet of UAVs may be deployed by a fleet operator to provide a delivery service for its own product offerings and/or for other vendors. A fleet of UAVs may be used for additional and/or other services, such as environment surveillance and emergency services support, among other non-limiting examples. The tasks associated with services provided by a fleet of UAVs may sometimes be referred to herein as "missions," a term meant to convey that a set of operational steps that may be involved in carrying out a task, such as delivery.

In order to support a fleet of UAVs in their missions, as well as support the service or services provided by the fleet, a fleet operator may also deploy an infrastructure. As described in detail below, such an infrastructure may include servers and computing systems for managing mission operations, coordinating UAV tasks, interfacing with customers (or other service recipients), and maintaining fleet health and readiness. In accordance with example embodiments, the infrastructure may be implemented in a centralized and/or distributed fashion, and may be organized hierarchically. Infrastructure may also include and or be connected with one or more communications networks, such as a public and/or private internet, for supporting communications between other infrastructure elements.

One aspect of maintaining fleet health and readiness may entail charging batteries of individual UAVs. In accordance with example embodiments, battery charging may be implemented using large-scale deployments of charging pads arranged in groups or clusters located at various sites across an operating region, such as a city or metropolitan area. For example, each vendor using a UAV delivery service may host a cluster of 10-50 or more charging pads at each of its vendor sites. Each cluster may be powered by available AC (alternating current) power, and be relatively inexpensive to operate, incurring only electric utility fees for intermittent usage, for example.

One aspect of mission operations may involve collecting and processing/analyzing various forms of operations reporting data from UAVs accumulated during missions, and providing various forms of operations configuration data to UAVs. In accordance with example, embodiments, infrastructure facilities for bulk data transfers between UAV and fleet support systems may include a wireless access point communicatively connected to a wireless and/or wireline broadband interface to a data backhaul network, such as a data/telecommunications carrier core network and/or internet. The data backhaul network may then be communicatively connected to servers and computer systems of the fleet support infrastructure. A UAV may communicate via a wireless connection with the wireless access point. In some instances, a UAV may have its own cellular wireless interface to a cellular data and telecommunications network. Unlike charging pads, large-scale deployment of bulk data-transfer facilities may incur significant costs to operate. This can be due, at least in part, to the cost of operating and maintaining large numbers of broadband interfaces, as well as other aspects of providing UAVs "full-service" operational support.

Example embodiments described by way of example herein are directed to systems and methods for mitigating the otherwise high cost of carrying out large-scale deployment of bulk data-transfer, by configuring certain UAVs of a fleet to act as "data ferries" to transport and/or transfer data between other UAVs of the fleet and a relatively small number of broadband-interface-based bulk data transfer stations. In accordance with example embodiments, one or more specialized UAV of a fleet may be equipped with a bulk data storage device and a wireless local area network (WLAN) interface that may be selectively operated as a WLAN access point (AP). In WLAN AP mode, a specialized UAV may form a WLAN connection with one or more other UAVs via their respective WLAN interfaces operating in an endpoint mode. In endpoint mode, the specialized UAV may communicate with the WLAN AP of a bulk data transfer station, which may relay or forward bulk data between the specialized UAV and system servers and/or data processing facilities. The specialized UAV may fly (or travel) between numerous charging pad clusters, where it may form respective WLANs (e.g., WIFI networks) with currently-charging UAVs, and one or more of a relatively few bulk data transfer facilities, where it may communicate bulk data to/from system servers, for example. The bulk data storage device of the specialized UAV may be used to store data collected from the other UAVs and/or data downloaded from system servers.

As described in more detail below, specialized UAVs may be used in a variety of operational scenarios. For example, multiple specialized UAVs may be used serially (e.g., in "daisy-chain" fashion) to carry bulk data one-to-another between other UAVs of a fleet and system servers. In some examples, most or all UAVs of a fleet may be equipped to perform as a specialized UAV, but only do so in particular circumstances when selected or triggered to do so according to some criteria or condition.

In other example embodiments, a specialized UAV acting as, or capable of acting as, a data ferry may have its own wireless broadband interface to a cellular data network, and may facilitate data transfers directly to and from network-based systems and servers and/or other infrastructure facilities, without having to rely on a WLAN connection at a broadband-connected bulk data transfer facility. For example, a specialized UAV may have its own subscriber identity module (SIM) card. Such a UAV may still act as a WLAN access point for data transfers to and from other UAVs, but would not necessarily have to travel to a bulk data transfer facility to communicate with network servers, for example.

In either of the above example embodiments (data ferries with or without wireless cellular interfaces, such as SIM cards), some or all of the UAVs of a fleet may be capable of acting as data ferries. In this arrangement, a group of collocated UAVs communicating via a WLAN may engage in an election process to decide which one of them should act as a data ferry in any given circumstance. For example a particular UAV of a group may be selected to receive operational data from other UAVs of the group, and then upload the data to network-based servers via a direct cellular connection if the particular UAV has one, or via a WLAN connection at bulk data transfer facility if the particular UAV does not have a direct cellular connection. As another example, a particular UAV of a group may act as a data ferry by virtue of having downloaded operational configuration data that applies to one or more other UAVs of the group. Other usage scenarios are possible as well in which other election procedures or algorithms are used.

In still another embodiment, the general ability of any one or more of multiple UAVs of a fleet to act as a data ferry—in the sense of any of the descriptions above—may be used to implement data distribution procedures among the fleet of UAVs, and between the fleet and network-based servers and support services, in a mode of information transfer that can be loosely characterized as a sort of "informed gossip." For example, any UAV that "finds" itself communication via a WLAN with a group of other UAVs—for example at a cluster of charging pads—may determine that another UAV of the group has a useful or required software update that it downloaded from a network-based server. Conversely, a particular UAV may have a software update that it can share with other UAVs of a group. In an example, two or more UAVs of a group may "share notes" on software updates that they have previously downloaded, in order to determine which update is most current or preferred. These are just some examples of how data and information can be distributed among a fleet of UAVs.

In any of the data ferry embodiments, when data or information transferred originates as a download from a network-based server (or other backend support) and is applicable to more than one UAV, the data communication model may offer significant economy of scale with respect to wireless cellular resources. This follows from using just one or a few cellular-based downloads to be distributed to multiple UAVs, without each of the UAVs needing to utilize its own cellular connection. Non-limiting examples of such downloads include software updates, machine learning models, and navigational updates (e.g., maps) that may apply to multiple UAVs. Other examples are possible as well.

More generally, specialized operation of UAVs for bulk data transport and transfer as summarized above may be considered just one example of a broader class of specialized functionality that certain UAVs of a fleet may utilize in support of fleet services and/or fleet operations. Non-limiting examples of other types of specialized services include survey UAVs that survey and/or map fiducial and charging pad locations, or search for deviations from surface maps, and UAVs that provide battery "jumper" services at malfunctioning charging pads. Other types of specialized UAV functionality are possible as well.

As a further aspect of the above example embodiments, one or more of the specialized functionalities could be carried out by other types of autonomous vehicles, besides only aerial vehicles. For example, a ground-based autonomous vehicle could make stops—scheduled, periodic, or otherwise—at different clusters of charging pads. While visiting any given cluster, the ground-based autonomous vehicle could act as a data ferry and/or mobile charging station, as described above. Accordingly, although embodiments are described herein by way of example in terms of UAVs, and implementations of ground-based or land-based autonomous vehicles are not necessarily described in specific technological details herein, it should be understood that ground-based and/or other types of autonomous vehicles could take on specialized functions in other embodiments. It should be further understood that operations described herein as being carried out by UVs could also be implemented in semi-autonomous, or even human-operated vehicles. UVs, semi-autonomous vehicles, and human operated vehicles could also include small vehicles, such as bicycles and scooters, large vehicles configured with larger equipment (in both size and weight) than might otherwise be accommodated by smaller UVs, boats, and/or submersible vehicles. Accordingly, the embodiments described herein in terms of UVs are not limiting with respect to the specialized functionality that they may carry out.

II. EXAMPLE UNCREWED VEHICLES

Herein, the terms "uncrewed aerial vehicle" and "UAV" refer to any autonomous or semi-autonomous vehicle that is capable of performing some functions without a physically present human pilot. As noted above, the term "unmanned" may sometimes be used instead of, or in addition to, "uncrewed," and it should be understood that both terms have the same meaning, and may be used interchangeably.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), or "uncrewed aerial system" (UAS) may also be used to refer to a UAV.

FIG. 1A is an isometric view of an example UAV 100. UAV 100 includes wing 102, booms 104, and a fuselage 106. Wings 102 may be non-flying stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
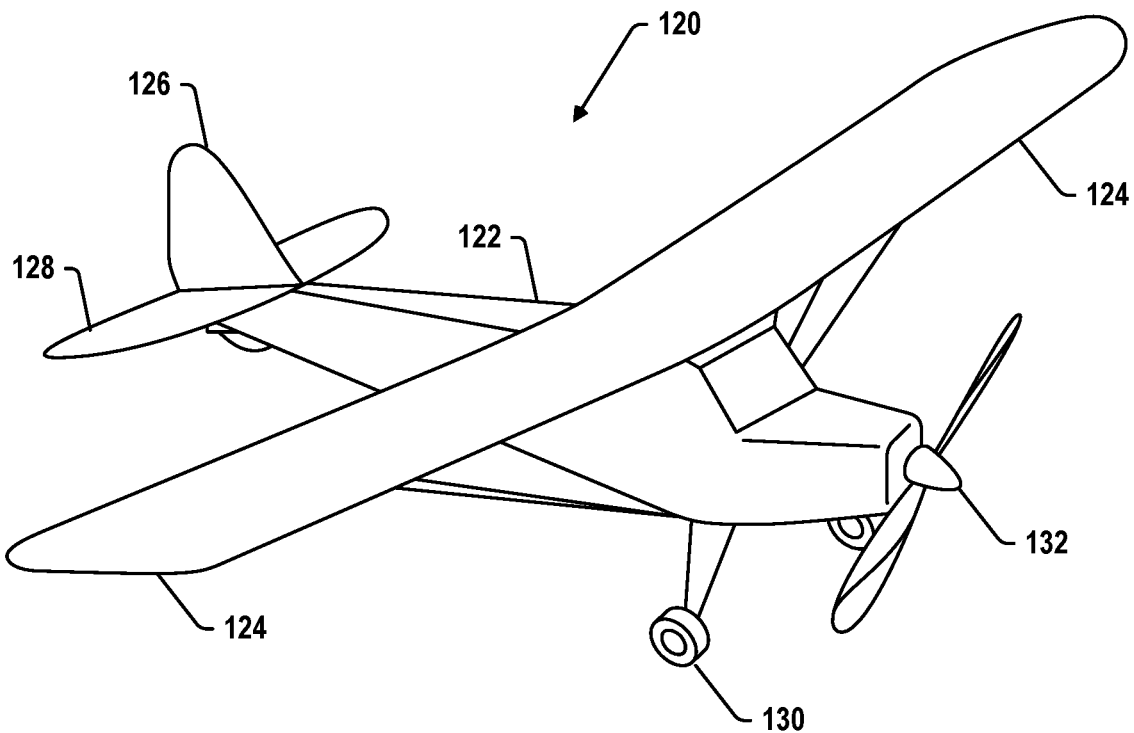
FIG. 1B is a simplified illustration of an uncrewed aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
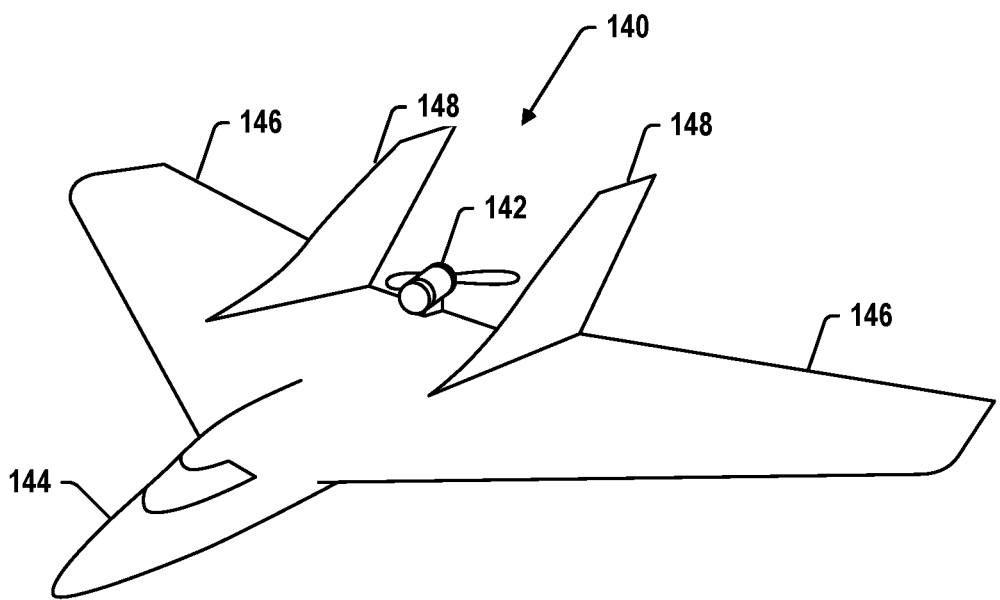
FIG. 1C is a simplified illustration of an uncrewed aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
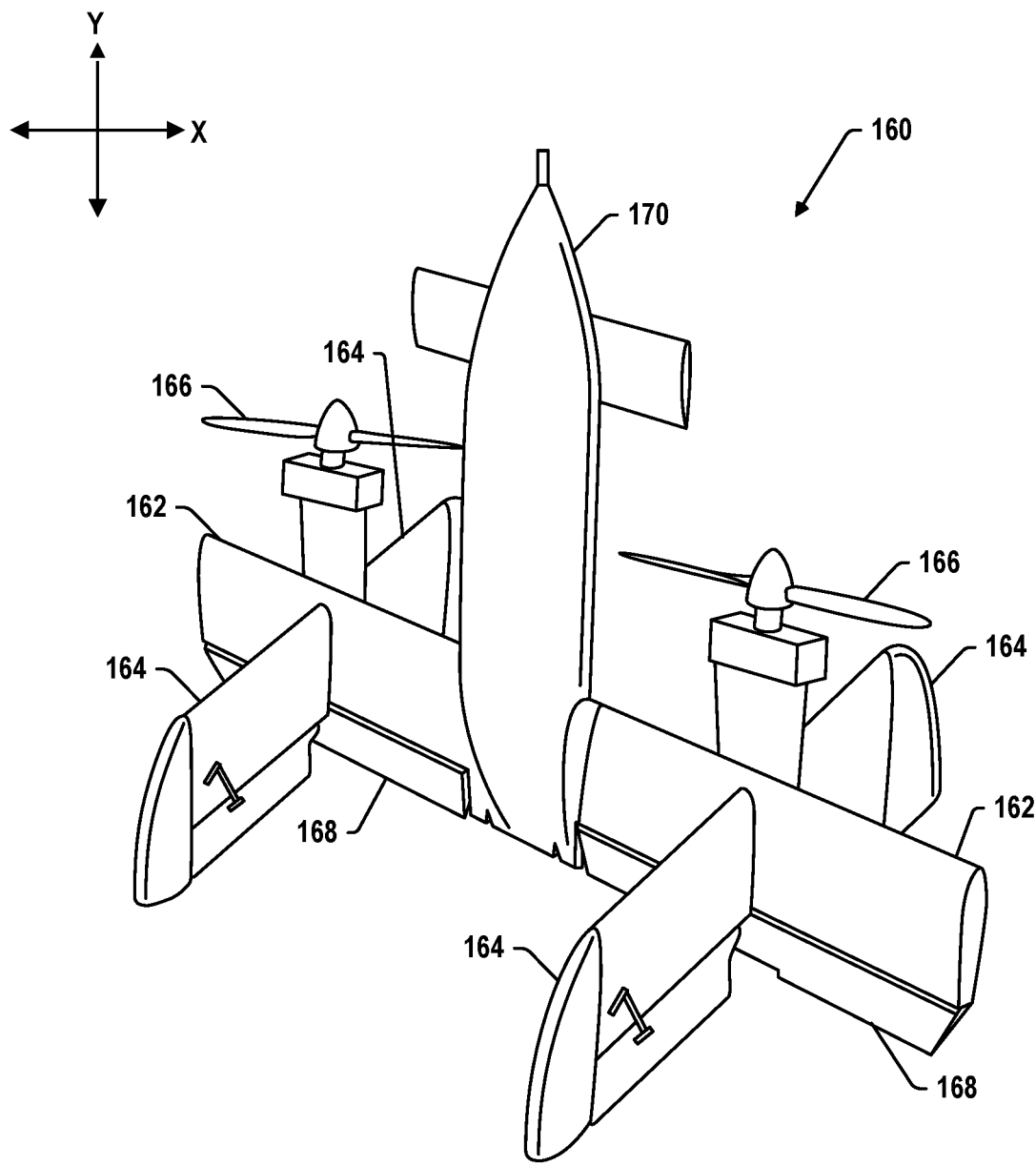
FIG. 1D is a simplified illustration of an uncrewed aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
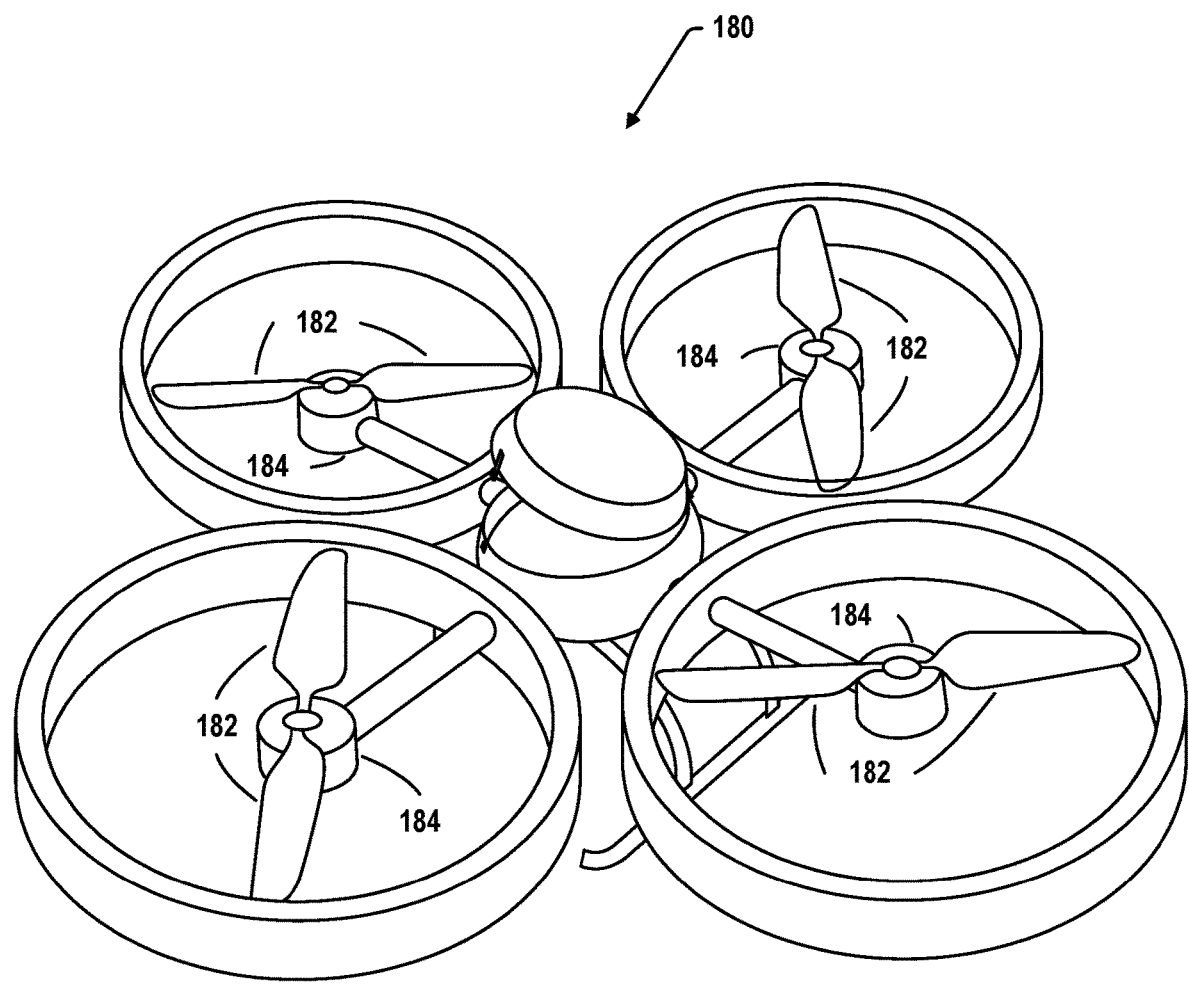
FIG. 1E is a simplified illustration of an uncrewed aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. ILLUSTRATIVE UAV COMPONENTS

Figure 2:
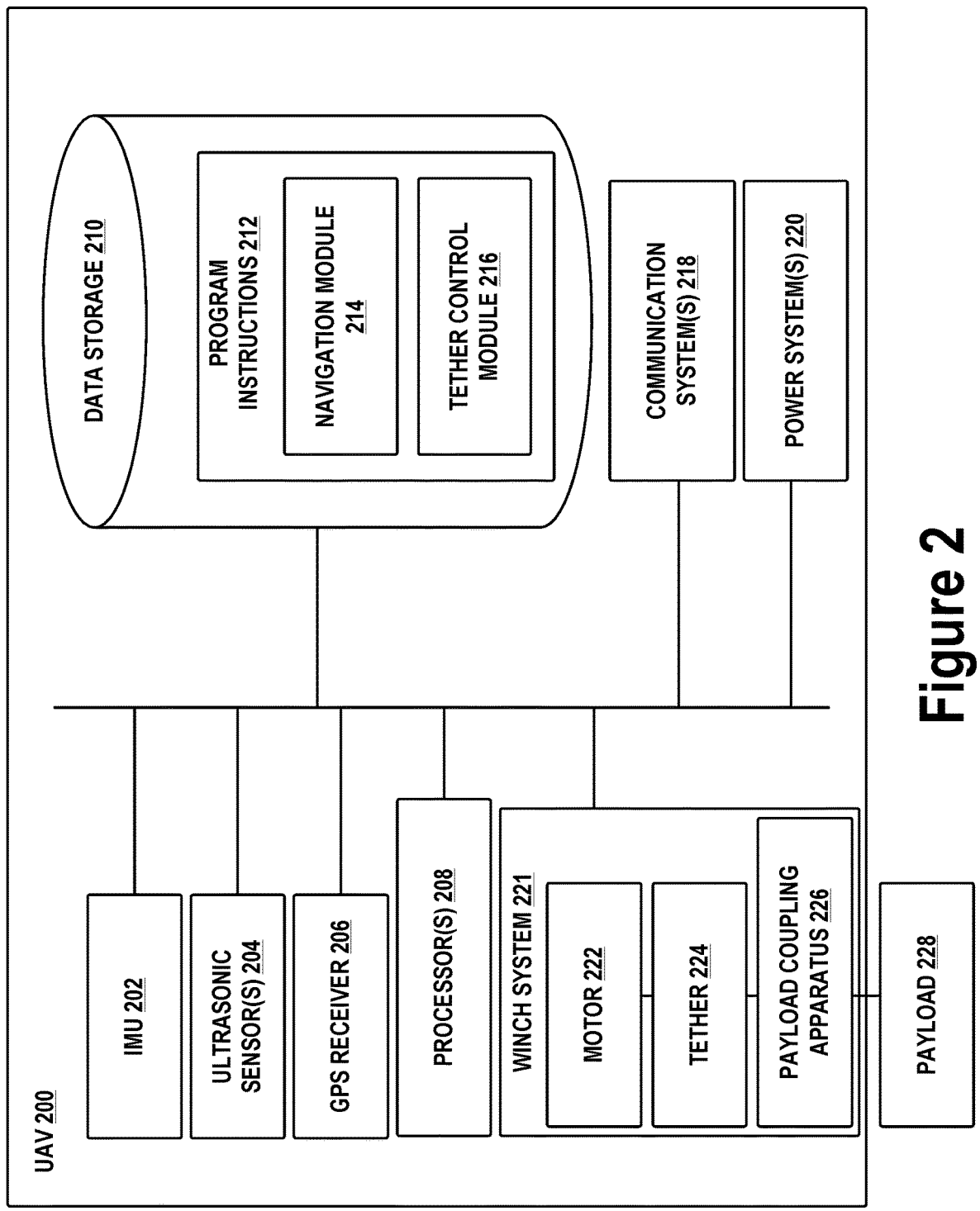
FIG. 2 is a simplified block diagram illustrating components of an uncrewed aerial vehicle, in accordance with example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron (s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV.

In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
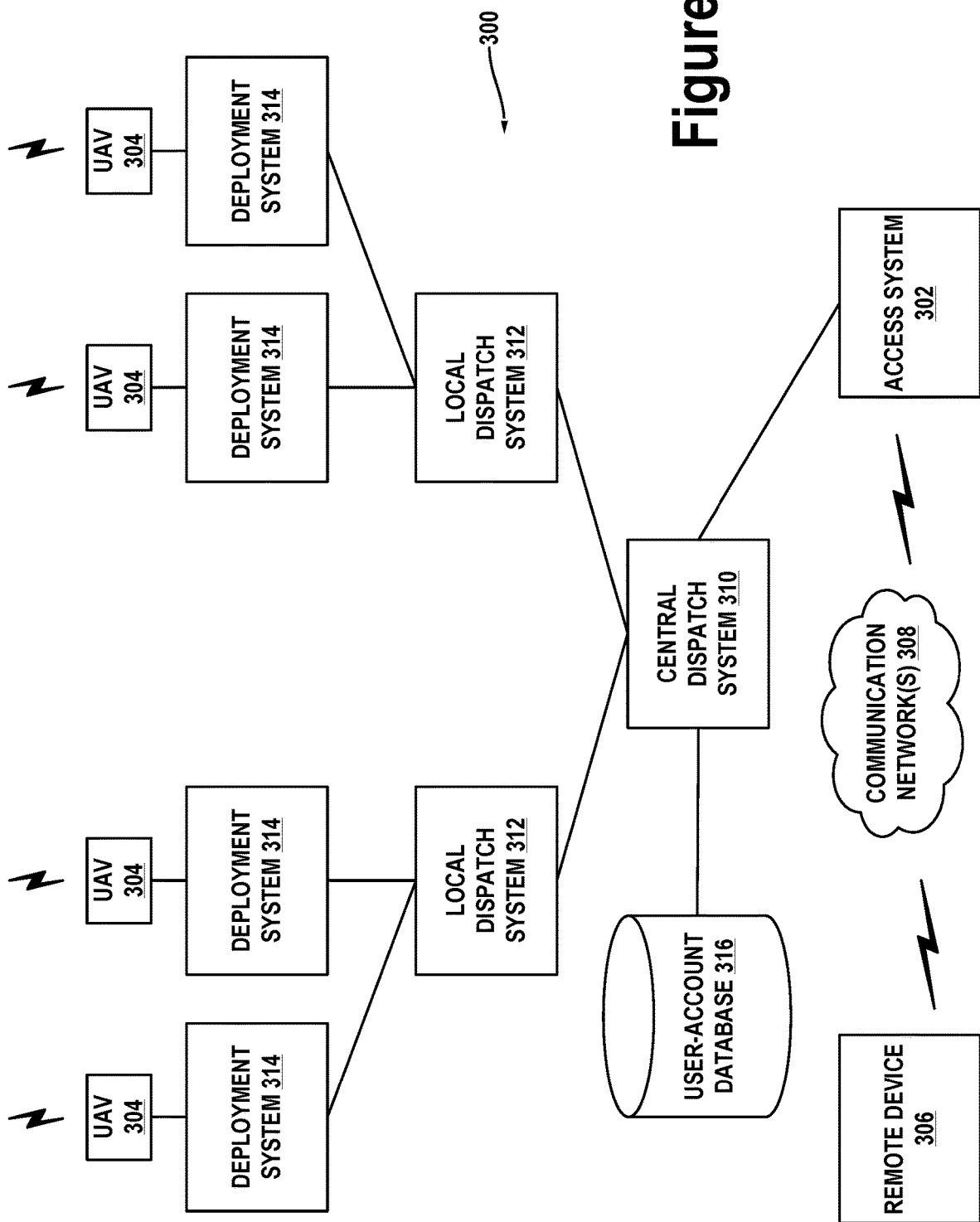
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system (s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. EXAMPLE SYSTEMS AND OPERATIONS FOR UAVS WITH SPECIALIZE FUNCTIONALITY FOR FLEET SUPPORT

A. Example Data Ferry Operations

The UAV system 300 illustrated in FIG. 3 is an example of a support infrastructure described briefly above in connection with battery charging pads and bulk data transfer. In connection with these aspects of UAV fleet operation, the deployment system(s) 314 of FIG. 3 may be considered as system components that could include communication interfaces to support bulk data transfers between UAVs and system servers. More particularly, the deployment system(s) 314 may function as launching and landing sites or platforms for UAV, and, as shown, may also be communicatively connected with other components of the infrastructure, including those which may support mission operations and data processing/analysis. As such, a deployment system 314 may provide a variety of support operations for UAVs, including communications with network-based servers and other infrastructure elements. Accordingly, while other configurations are possible for bulk data transfer sites, there is no loss in generality by considering an example in which bulk data transfers are accommodated by infrastructure at the deployment system(s) 314. Such "full-service" deployments systems are sometimes referred to as "jet bridges," in analogy to like-named facilities where commercial aircraft typically park at airport terminals.

Deployment sites for charging pads and/or charging pad clusters are not necessarily evident in FIG. 3. As discussed above, charging pad clusters may be implemented as largely standalone devices connected to AC power, and possibly configured to function as little more than landing pads or platforms with battery charging facilities. In practice, they may be located at delivery pick-up sites, such as vendors' warehouses or retail stores, for example. UAVs may be controlled and/or preprogrammed to visit such sites to retrieve items for delivery, and to charge their batteries during their stopovers, but may not necessarily need any other services during each such stop.

Figure 4A:
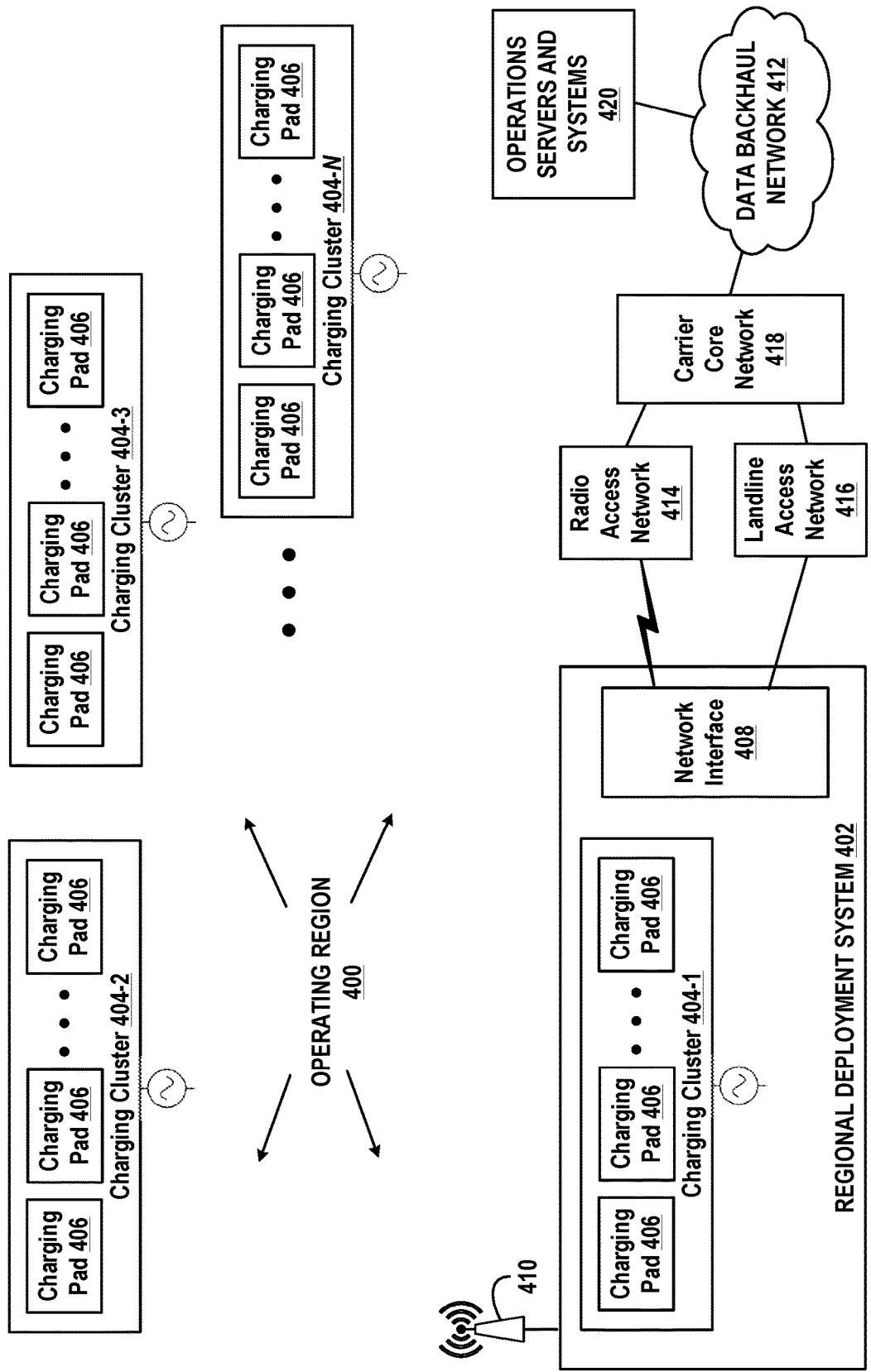
FIG. 4A illustrates an example operating region of one or more UAVs, in accordance with example embodiments.

FIG. 4A illustrates an example operating region 400 served by a regional deployment system 402 that includes a charging pad 404-1. The operating region 400 is also served by and standalone charging pad clusters 404-2 404-3, . . . , 404-N. In the context of FIG. 3, the regional deployment system 402 could correspond to one of the deployment systems 314 configured to support battery charging and bulk data transfers in the example operating region 400. As shown, the charging pad clusters 404-2, 404-3, . . . , 404-N may also be configured for supporting battery charging in the operating region 400. By way of example, the operating region 400 could be a large or small city, a metropolitan area, or geographical region. The number of regional deployment systems 402 and/or standalone charging pad clusters 404-1, 404-2, . . . , 404-N that support an operating region 400 could depend on its size, among other possible factors.

In addition to the charging cluster 404-1, the regional deployment system 402 may also include a network interface 408, and a WLAN AP 410 (such as a WIFI access point). The regional deployment system 402 may include other components for support functionality described above in connection with deployment system(s) 314, as well. In accordance with example embodiments, the regional deployment system 402 could be a jet bridge.

Each charging cluster 404-1, 404-2, 404-3, . . . , 404-N may include one or more charging pads 406. Each charging pad may include a physical platform on which a UAV may rest, for example upon landing from flight, and may further include electrical contacts to which complementary contacts on the UAV may connect. In an additional or alternative arrangement, one or more of the charging pads 406 could support wireless charging, using electrical induction, for example. The charging pad may then charge the UAV battery using power supplied from a connected AC power source, as represented by an AC icon in the figure. To the extent that a charging pad may serve as little more than a landing pad or platform with a charging hook-up (wired and/or wireless), charging clusters may be widely and easily deployed and relatively inexpensive to operate, requiring perhaps only a typical AC power outlet, for example. Thus, depending on the size of an operating region and the number of vendor and/or other types of sites serviced by a delivery fleet, among other possible factors, there could be tens or hundreds or even more of charging clusters deployed, some as components of one or more regional deployment system(s) 402, and most as standalone clusters.

The network interface 408 of the regional deployment system 402 may provide connectivity to one or more communications networks, represented in a simplified form in the FIG. 4A as a radio access network 414 and a landline access network 416, a carrier's core network 418, and a data backhaul network 412. In an example arrangement, the data backhaul network 412 could provide connectivity to operations servers and systems 420 of a UAV system, such system 300 in FIG. 3, for example. Referring again to FIG. 3, the operations servers and systems 420 could represent any one or more of the local dispatch system 312, the central dispatch system 310, the user-account database 316, or the access system 302. There could be other elements as well. The data backhaul network 412 could represent the communication network(s) 308, such as an internet.

In an example arrangement and operation, the network interface 408 may implement an air (radio) interface to the RAN 414 and/or a landline interface to the landline access network 416. Either or both of these interface connections could then provide connectivity back to the operations servers and systems 420 via the intervening networks—e.g., the carrier core network 418 and the data backhaul network 412. Other arrangements are possible as well. In view of the connection provided by the regional deployment system 402 to the data backhaul network 412, via its network interface 408, the regional deployment system 402 may be referred to generally as a "backhaul device." While this term highlights the role of the regional deployment system 402 in communications with and/or over the backhaul network, it should not be taken limit other capabilities and/or functions of regional deployment system 402 (such as those discussed above in connection with deployment system(s) 314, for example).

Both the RAN 414 and landline access network 416 may provide high speed/high bandwidth connectivity to the carrier core network 418, suitable to support large data transfers between the operations servers and systems 420 and regional deployment system(s) 402. For purposes of the discussion herein, both may be referred to as a broadband interface or broadband connection. The cost of operating a broadband interface—e.g., subscription costs for end users—while possibly competitive among different carriers and network operators, can become high when large amounts of data need to be transferred between support servers (represented by the operations servers and systems 420) and individual UAVs of a large fleet. A regional deployment system 402 (e.g., jet bridge) may have other, additional costs associated with providing full service support to UAVs. Consequently, in contrast to charging clusters, deployment and operation of a large number of regional deployment system(s) 402 (or other components that have broadband interfaces) can be very expensive.

In accordance with example embodiments, then, one or more specialized UAVs may be configured to act as a data ferry to transfer data between individual UAVs and a relatively small number of regional deployment system(s) 402. Doing so, as described by way of example below, thereby enables a UAV system to be deployed at significant operational savings over what would otherwise be possible. As described briefly above, data ferry operations may be implemented in one or both of two modes. In the first mode, a UAV may use regional deployment system(s) 402 as broadband access facilities for communicating with network-based servers via WLAN AP 410 and network interface 408. In the second mode, a UAV may use its own direct wireless cellular interface (e.g., SIM card) with a cellular broadband network. It should be understood that these two modes of connection with a backhaul network to network-based servers are not mutually exclusive: both modes could be implemented by a given UAV acting as a data ferry and/or among a fleet of UAVs. Each mode is discussed in more detail below.

1. Communications with a Backhaul Network Via Jet Bridge Access

Figure 4B:
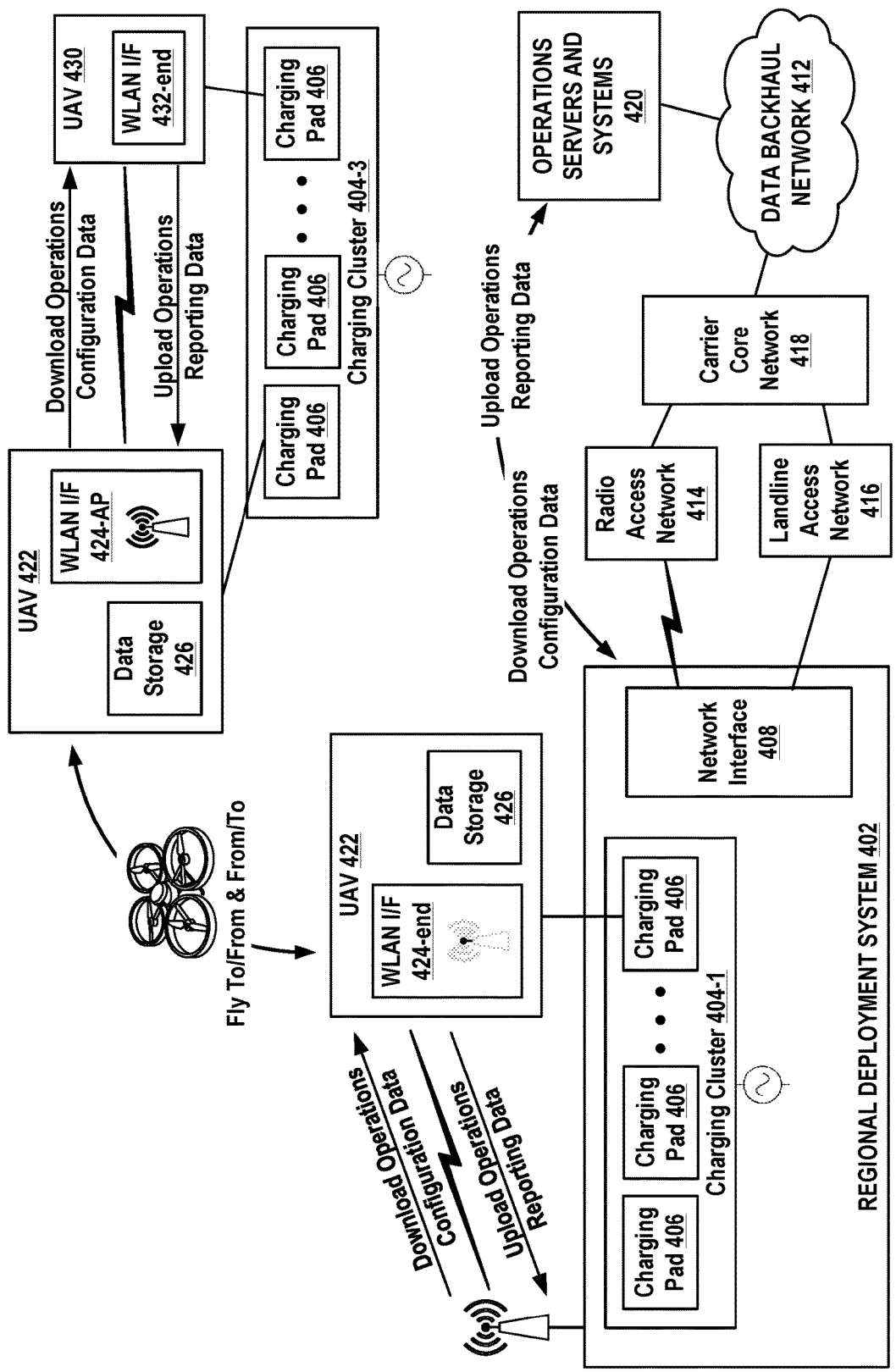
FIG. 4B illustrates example operations of a UAV in an example operating region, in accordance with example embodiments.

FIG. 4B illustrates certain aspects of example operation of an example the specialized UAV 422 in the operating region 400 of FIG. 4A. It should be understood that the all of the operations of UAV 422 described below could be carried out by other forms of uncrewed vehicles (UVs), such as a land-based or ground-based UV, with the exception of flying as a mode of travel. Thus, for example, where a UAV may fly from one cluster of charging pads to another, a ground-based UV would travel by land. However, other operations described below for a UAV 422 could be carried out by a ground-based UV, and there is no loss in generality by describing operations in terms of a UAV.

For the sake of clarity in FIG. 4B, the only charging cluster shown is charging cluster 404-3, and the labels "400" and "410" have been omitted. Also shown in the figure is a representative UAV 430, which may be a non-specialized UAV, or at least a UAV that is not operating in a specialized mode in the circumstance illustrated.

As a visual cue representing travel of the specialized UAV 422 between the regional deployment system 402 and the charging cluster 404-3, the specialized UAV 422 is depicted at both locations. A double curved arrow labeled "Fly To/From & From/To" (with an icon of a UAV) represents possible travel in either direction. The specialized UAV 422 may carry out operations specific to where it is located in the operating region 400, as described below.

As shown, the specialized UAV 422 includes a WLAN interface 424 that may be configured to operate as an access point in an access-point mode, indicated by the label "WLAN I/F 424-AP," or as an endpoint in an end-point mode, indicated by the label "WLAN I/F 424-end." The access-point mode is also represented with an access point icon, while the end-point mode is represented by a grayed-out access point icon. In an example embodiment, the WLAN could be a WIFI network, according to the well-known IEEE 802.11 family of standards. Other wireless LANs and/or standards may be possible as well.

The specialized UAV 422 also includes storage 426, which may be additional storage beyond that provided by data storage 210 shown in FIG. 2. For example, data storage 426 could be a mass storage device with a larger volume—e.g., 1-2 terabytes—than that required for typical UAV operations. In other arrangements, data storage 210 could be sufficiently large to include data storage 426 without requiring a separate, larger storage device. In either case, for purposes of the discussion herein, the term "additional storage" will be used in reference to data storage 426 in order to indicate its specialized use in the specialized UAV 422, beyond the use described in connection with data storage 210.

The UAV 430 is shown as including a WLAN interface configured for operating only in end-point mode, as indicated by the label "WLAN I/F 432-end," and may not necessarily include the additional storage. This illustrative configuration is meant to distinguish the UAV 430 as either not having the specialized capabilities of the specialized UAV 422, or not operating in a mode that uses specialized capabilities that the UAV 430 might otherwise have. For example, some or all of the UAVs of a fleet might be capable of operating as the specialized UAV 422, but may only do so under certain operational circumstances or conditions. This possible arrangement is discussed in more detail below.

Operation of the specialized UAV 422 as a data ferry may be described by way of example, as follows. Generally, the specialized UAV 422 may upload and store in data storage 426 data from one or more UAVs 430, and may subsequently upload the stored data to operations servers and systems 420. The specialized UAV 422 may also download and store in data storage 426 data from operations servers and systems 420, and subsequently download all or select portions of the stored data to one or more UAVs 430.

Upload operation is depicted in FIG. 4B by the specialized UAV 422 positioned at the charging cluster 404-3, with WLAN I/F 424-AP operating in AP mode, as indicated. By way of example, UAV 430 is also positioned at the charging cluster 404-3. In such an arrangement, both UAVs may have landed, each at a different one of the charging pads 406, and may be in non-flying, stationary states during charging, as represented by the connections between the UAVs and their respective charging pads 406. While positioned at the charging cluster 404-3, the specialized UAV 422 may establish a temporary or "opportunistic" WLAN (e.g., a WIFI network) to which UAV 430 may connect. In accordance with example embodiments, connecting to and/or membership in the WLAN may require authorization and/or authentication, so that only UAVs of a fleet or group, or a specific subset thereof, may gain access to the WLAN.

Using the WLAN network connection, the UAV 430 may upload various operations reporting data. Non-limiting examples of such data may include flight and/or mission operation logs. The volume of these data may be too large for practical uploading via other communication interfaces the UAV 430 may use for communicating with the UAV system 300, for example. The WLAN (e.g., WIFI) network, however, may accommodate such an upload transfer easily and efficiently. The upload transfer is indicated by the arrow from UAV 430 to the specialized UAV 422 labeled "Upload Operations Reporting Data."

After uploading operations reporting data from UAV 430, the specialized UAV 433 may then travel, as indicated, to the regional deployment system 402 and again operate in a non-flying, stationary state after landing, for example. The specialized UAV 422 may operate its WLAN I/F 424-end in end-user mode, whereby it may join a WLAN provided by the AP 410 of the regional deployment system 402. Again, the WLAN may be a WIFI network. In practice, the specialized UAV 422 may upload operations reporting data from more than one other UAV 430 while at the charging cluster 404-3, and/or may visit other charging clusters at which other UAVs 430 are "parked" on its way to the regional deployment system 402. The data storage 426 may thus be configured sufficiently large to accommodate multiple uploads from multiple UAVs 430—the specialized UAV 422 thereby acting as a "data ferry."

As indicated by the arrow from the specialized UAV 422 to the AP 410 labeled "Upload Operations Reporting Data," the stored operations reporting data may be upload to the operations servers and systems 420 via the broadband interface (RAN and/or landline), the carrier core network 418, and the data backhaul network 412. The upload operation from the broadband network is indicated by the double curved arrow, which represents one or more communicative connections in either direction according to the upload/download labels. While uploading the operations reporting data, the specialized UAV 422 may also recharge its batteries, if necessary, for example. In some example operations, there may be more than one regional deployment system 402 in an operating region 400, and the specialized UAV 422 may visit more than one of them, carrying out upload operations at some or all of the regional deployment systems 402 visited.

Note that a UAV 430 could also visit a regional deployment system 402 and upload its operations reporting data directly. However, in an example deployment, there may be only one or a few regional deployment systems 402 with a data backhaul (e.g., broadband) interface. Further, during mission operations, a given UAV 430 may have fewer opportunities to visit a regional deployment system 420 compared with many more opportunities to visit any one or more of the numerous charging clusters 404, where it may upload its operations reporting data to a specialized UAV 422, as described.

Download operation is largely similar to upload operation in terms of travel by the specialized UAV 422 between the regional deployment system(s) 402 and one or more charging cluster 404, and in terms of the WLAN network connections established. The primary difference is that download operation begins with the specialized UAV 422 downloading operations configuration data from the operations servers and systems 420 over the data backhaul network 412, the carrier core network 418, and via the broadband interface of the regional deployment system 402. The download operation to the broadband network is indicated by the double curved arrow, according to the upload/download label. Non-limiting examples of operations configuration data may include software updates, machine learning models, navigational data updates, or mission specifications. Some operations configuration data may be specific to one or more UAVs 430, and may be identified as such, for example.

Operations configuration data downloaded from the operations servers and system 420 may be further downloaded to the specialized UAV 422 via its WLAN network connection with the AP 410 of the regional deployment system 402. This "leg" of the download is represented by the arrow from the AP 410 to the specialized UAV 422, labeled "Download Operations Configuration Data." The downloaded data may be stored in the data storage 426.

After downloading operations configuration data (or other types of data), the specialized UAV 422 may travel to one or more charging clusters, exemplified in FIG. 4B by charging cluster 404-3. As shown, the specialized UAV 422 may then operate its WLAN I/F 424-AP in access-point mode and establish a WLAN network connection with one or more UAV(s) 430 at the charging cluster 404-3. As with upload operation, connecting to and/or membership in the WLAN may require authorization and/or authentication, so that only UAVs of a fleet or group, or a specific subset thereof, may gain access to the WLAN. The specialized UAV 422 may then download some or all of the stored operations configuration data from data storage 426 to the one or more UAV(s) 430 via the WLAN network connection. This download is represented by the arrow from the specialized UAV 422 to UAV 430, labeled "Download Operations Configuration Data."

In accordance with example embodiments, some portion of the stored operations configuration data may be specific to one or more particular UAV(s) 430, and some may be applicable and/or intended for all or more than one. For example, specific mission data, such as particular delivery pick-up and drop-off sites, might apply to only specific UAVs 430. However, certain navigational data, such as navigational and/or terrain maps, could be applicable to all or a group of UAVs 430. These are just a few examples.

In some UAV fleet deployments, many or all of the UAVs may be equipped with wireless cellular interfaces, such as SIM cards. While such an arrangement may seem at first to reduce the need for data ferry operations, there can be significant costs involved in widespread and/or routine utilization of direct wireless cellular communications by large numbers of so-equipped UAVs. In particular, for downloaded data that is applicable to multiple UAVs, such as software updates, machine learning models, or navigational maps, the ability of a UAV data ferry to receive the data via a regional deployment system 402, and then distribute the data to the multiple UAVs via one or more WLAN connections may provide significant wireless cellular cost savings compared with separate wireless cellular downloads directly to each of the multiple UAVs. For example, for a one gigabyte software update applicable to 100 UAVs, a single download to a UAV data ferry for distribution to all 100 UAVs would incur roughly eight gigabytes of wireless cellular download usage, compared with roughly 800 gigabytes for 100 separate downloads. This is just one example. There could be other cost-saving scenarios and economies of scale associated with relying on UAV data ferries as much as possible for wireless cellular communications (via regional deployment systems 402).

Other aspects of example operation that are not necessarily evident in FIGS. 4A and 4B may involve how and when the specialized UAV 422 determines which charging clusters 404 to visit, which UAV(s) 430 it may expect to find at any given charging cluster 404, and how and when the specialized UAV 422 determines which UAV(s) 430 are in need of uploading their operations reporting data. Further example aspects may involve how and when the specialized UAV 422 determines which regional deployment system(s) 402 to visit, and how the specialized UAV 422 determines which operations configuration data should be delivered to which UAV(s) 430. Still further aspects of example operation may involve determining which among two or more specialization-capable UAVs at a given charging cluster 404 should act, or be selected to act, as a the specialized UAV 422, and possible use of a "daisy-chain" mode of data transfer in which one the specialized UAV 422 transfers its stored data (uploaded and/or downloaded data) to another specialized UAV 422 that the travels another leg of travel to another charging cluster 404 or regional deployment system 402. Multiple of such "relay legs" could form linear routes and/or branching routes, for example. Some of these other aspects of operation are discussed below by way of example.

In accordance with example embodiments, one or more UAVs of a fleet or group may be specialized UAVs by design or default, and/or designated, from among one or more specialized-capable UAVs, to function as specialized UAVs. Thus, a given specialized UAV may be configured to always perform specialized functions, e.g., by default, or may be invoked or activated to do so by condition or circumstance. In an example usage scenario, a specialized UAV 422—performing as such by default or prior activation—may visit one or more charging clusters 404 in an operating region 400 according to a programmed itinerary and/or on demand. At each visited charging cluster 404, the specialized UAV 422 may find one or more other UAVs 430 in need of uploading accumulated operations reporting data. The specialized UAV 422 may then upload and store the operations reporting data from at least one of the other UAVs 430, and subsequently visit a regional deployment system 402 where it may upload an aggregation of the stored operations reporting data collected from the one or more other UAVs 430 at the one or more visited charging clusters 404.

In further accordance with example embodiments, an "on demand" visit to a charging cluster 404 may be arranged by one or more UAVs 430 sending a status message to the UAV system 300 requesting an upload and/or alerting the system of the need to upload. The UAV system 300 may then communicate with one or more specialized UAVs 422 instructing it (or them) to visit one or more particular charging clusters 404 in order to meet the UAVs 430 that requested uploads. Other procedures for on demand uploads are possible as well.

In an example procedure for itinerary-based visits of a specialized UAV 422 to one or more charging clusters 404, the UAV system 300 may use mission scheduling information for part or all of a fleet or group of UAVs 430 to predict when various UAVs 430 of the fleet will likely need to upload their operations reporting data, and where they will be—e.g., a nearest charging cluster 404, for example—at the approximate time. Additionally or alternatively, the UAV system 300 may instruct one or more UAVs 430 to visit specific charging clusters 404 according to the itinerary of one or more specialized UAVs 422. Other procedures for itinerary-based uploads are possible as well.

Some usage scenarios may involve opportunity-based uploads. In one example, a specialized UAV 422 may happen to visit a charging cluster 404 at the same time as one or more other UAVs 430 in need of uploading are also visiting the same charging cluster 404. The specialized UAV 422 may establish a WLAN by default at any charging cluster 404 that it visits. In doing so, it may connect with the one or more other UAVs 430 and thereby learn of their need to upload. Any uploads may then be carried out as described above, for example.

In another opportunity-based example, two or more specialized UAVs 422 or specialized-capable UAVs may happen to visit a charging cluster 404 at the same time as one or more other UAVs 430 in need of uploading are also visiting the same charging cluster 404. One of them may establish a WLAN by placing its WLAN interface in AP mode. For example, the first specialized UAVs or specialized-capable UAV to arrive may establish the WLAN as a routine matter, and any subsequent ones may refrain from doing so upon detecting an existing WLAN. Once a need for uploading operations reporting from among the UAVs at the charging cluster 404 is determined, the specialized UAVs 422 and/or specialized-capable UAVs may engage in one or another form of negotiation to determine which one or more of them should perform upload operations with the other UAVs. After selection of which one or more specialized UAVs should be active, upload operations may proceed as described above.

Non-limiting examples of negotiation/selection may include a random selection, a selection based on amount of storage available among candidates for specialized UAV, upcoming itineraries of candidates for specialized UAV, and a predetermined ranking system of the candidates for specialized UAV. Other factors in selection may involve date/time, and instructions from the UAV system 300, for example.

Similar procedures may apply to download scenarios, although download operations may tend to involve somewhat more planning and/or deliberation on the part of the UAV system 300 in view of the possibly UAV-specific nature of at least some operations configuration data (or targeted download data in general). Additionally, a specialized UAVs 422 and/or specialized-capable UAV may likely be selected by the UAV system 300 (or some component thereof) to activate or invoke its specialized functionality in order to carry out a mission of downloading data from the operations servers and systems 420 and then traveling to one or more charging clusters 404 to deliver via download the data to one or more other UAVs 430.

In accordance with example embodiments, a specialized UAV 422 may carry out both upload and download operations. For example, a specialized UAV 422 may embark on a download mission with stored operations configuration data to deliver to particular UAVs 430, and at one or more charging clusters 404 visited may also upload operations reporting data from other UAVs 430, possibly including one or more of the particular UAVs 430. This is just one example; others are possible as well.

In accordance with example embodiments, upload and/or download operations may also be carried out in a daisy chain of two or more specialized UAVs 422, passing or "relaying" data from one to the other during mutual visits to or more charging clusters 404. In an example, the two or more specialized UAVs 422 may form a WLAN, as described above, and transfer stored data between them in either or both directions. The data transferred could be uploaded, downloaded, or both. For example, a first specialized UAV 422 could transfer operations configuration data to second specialized UAV 422 for an eventual download to a UAV 430 at a charging cluster 404 to be visited later by the second specialized UAV 422. At the same time, the second UAV 422 could transfer operations reporting data to the first specialized UAV 422 of eventual upload to the operations servers and systems 420 during a later visit to a regional deployments system 402. Other combinations of transfers are possible as well.

In further accordance with example embodiments, combined or aggregate routes traveled by specialized UAVs 422 that engage in data transfers could be linear, such as spanning points "A," "B," "C," . . . in sequential fashion, or could be branched, spanning these or other points in a hierarchical fashion. Branched routing could be used as a way to distribute a delivery workload among specialized UAVs 422, for example. Other routing models could be used as well.

2. Communications with a Backhaul Network Via Direct Wireless Cellular Access

As described above, many or all of UAVs of a fleet may be equipped with wireless cellular interfaces, such as SIM cards. In accordance with example embodiments, a UAV with a SIM card, or other form of wireless cellular interface for direct communications with a cellular broadband network (e.g., via a RAN or base station), may carry out all the functions of a data ferry described above, but without the need to rely on a regional deployment system 402 (or other jet bridge) for connecting to a backhaul data network 412.

Figure 4C:
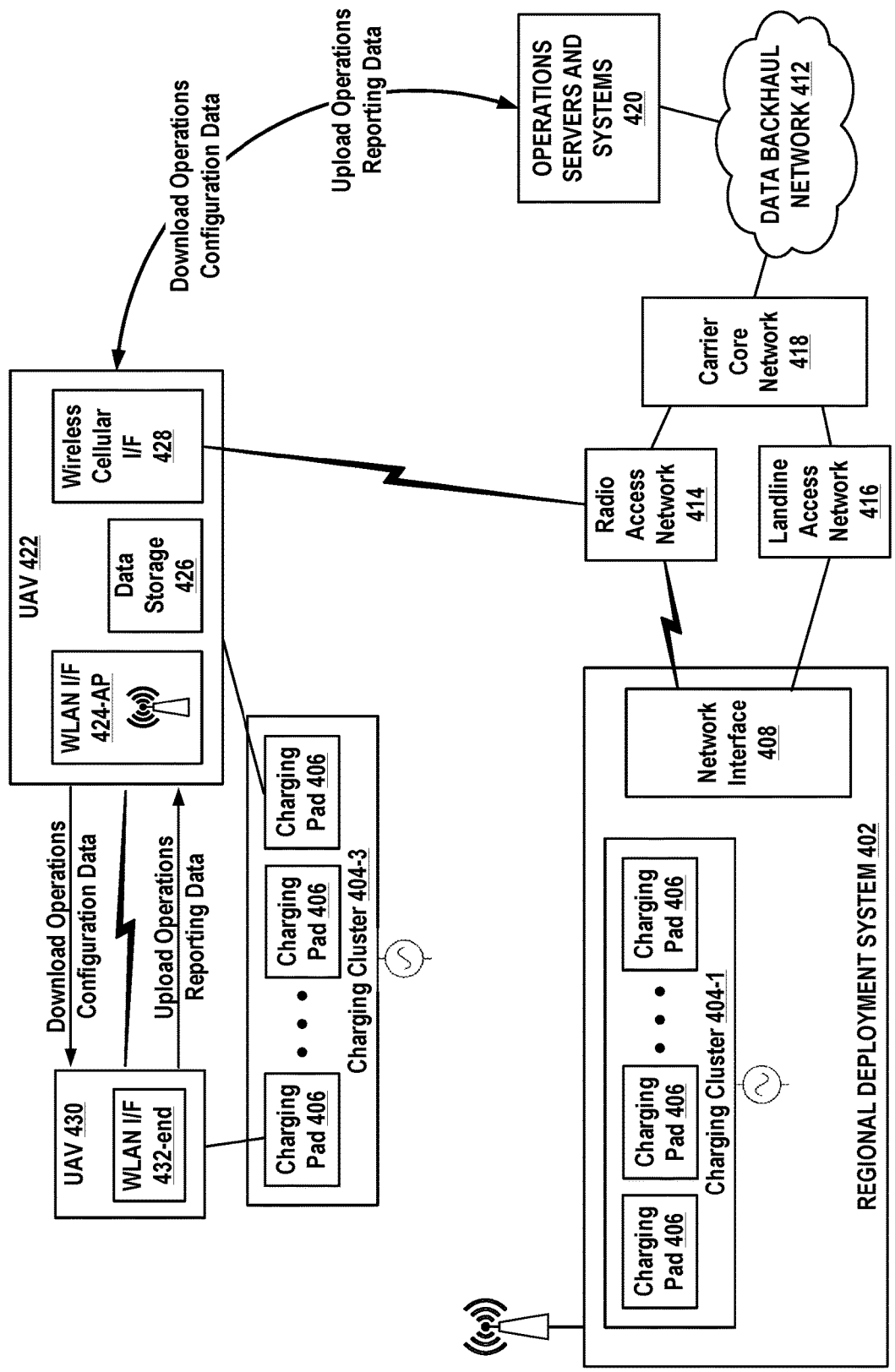
FIG. 4C illustrates another example of operations of a UAV in an example operating region, in accordance with example embodiments.

FIG. 4C illustrates an example of such a UAV data ferry, conceptually depicting similar operational aspects as shown in FIG. 4B. As with the discussion in connection with FIG. 4B, the operations illustrated in FIG. 4C are described by way of example in terms of a UAV 422. Again, the operations could be carried out by other forms of UVs, such as a land-based or ground-based UV, with the exception of flying as a mode of travel. Accordingly, there is no loss in generality by describing operations in terms of a UAV. For completeness of the present discussion, FIG. 4C also depicts the regional deployment system 402, shown also in FIGS. 4A and 4B.

As shown, the UAV 422 in FIG. 4C includes a WLAN I/F 424-AP configured for operation as a WLAN access point (e.g., a WIFI AP). Although not necessarily shown in FIG. 4C, this interface can also operate in an end-point mode as WLAN I/F 424-end, similarly to the WLAN I/F 432-end of the UAV 430, also shown in the figure. In addition to data storage 426 (as described above), the UAV 422 of FIG. 4C now also includes a wireless cellular I/F 428 capable of connection directly with a wireless cellular network. In accordance with example embodiment, the wireless cellular I/F 428 may be a SIM card, or other similar or comparable component, capable of establishing an air interface connection with RAN 414, and thereby establishing a communicative connection with the operations servers and systems 420 via the carrier core network 418 and the data backhaul network 412.

As indicated, the UAV 422 may then exchange operational data with the operations servers and systems 420 via the established communicative connection. More particularly, the UAV 422 may download operations configuration data from the operations servers and systems 420, and upload operations reporting data to the operations servers and systems 420. As also indicated, the UAV 422 may act as a data ferry or, in some circumstances, a data relay or data forwarder, by exchanging operational data with a UAV 430 via a WLAN connection, as described above.

Thus, for example, operations configuration data downloaded to the UAV 422 from the operations servers and systems 420 may be stored in the data storage 426, and subsequently downloaded to the UAV 430 if the operations configuration data are determined to be applicable and/or useful to the UAV 430. Conversely, operations reporting data uploaded to the UAV 422 from the UAV 430 may be stored in the data storage 426, and subsequently uploaded to the operations servers and systems 420.

In accordance with example embodiments, operations configuration data downloaded to the UAV 422 from the operations servers and systems 420 may be applicable and/or useful to multiple UAVs 430. As such, a single download of operations configuration data to the UAV 422 from the operations servers and systems 420 may be distributed to multiple UAVs via one or more WLAN connections, but by utilizing only one wireless cellular connection. In this way, significant cost savings may be achieved compared with otherwise using multiple wireless cellular connections.

As noted, other data ferry operations involving one or more direct wireless cellular connections between the UAV 422 and the operations servers and systems 420 are the same or similar to those described in connection with communications via a jet bridge (e.g., regional deployment system 402). These may include a data ferry UAV traveling from one cluster of charging pads to another, data ferrying among UAVs in daisy-chain and/or branching fashion, and selection of a particular UAV among a group of UAVs at a cluster of charging pads to act as a data ferry. In accordance with example embodiments, selection may involve an election procedure or algorithm for choosing a particular UAV that is best suited (e.g., satisfies the most and/or most important criteria) to carry out data ferry tasks, an instruction from the operations servers and systems 420, or a predetermined assignment. Other forms of selection determinations may be used as well.

3. Example Adaptive Data Distribution Modes

A UAV deployment scenario in which multiple (some or all) UAVs of a fleet are equipped with a direct wireless cellular communication interface, such as wireless cellular IF 428, can provide a basis for form or mode of adaptive data distribution among the fleet. Referred to above in loose (and informal) terms as "informed gossip," adaptive data distribution may be an efficient and cost-effective way to supply fleet UAVs with various operations configuration data updates and/or other provisioning information. Adaptive data distribution may be described by way of the following operational example.

A UAV 422 may download from the operations servers and systems 420 a new or updated version of some operations configuration data. Non-limiting examples include a software update, machine learning models, new and/or updated operational parameters, and new and/or update navigational data, such as navigational maps. The UAV 422 may subsequently fly (or travel) to a cluster of charging pads and establish a WLAN via its WLAN I/F 424-AP with one or more other UAVs at the cluster. Access/admission to the WLAN may be restricted to authorized users, and UAV 422 and some or all of the other UAVs at the cluster may be authorized to join the established WLAN. The UAVs in the established WLAN may exchange information about which operations configurations data versions and/or updates that they are using and/or have installed, for example. By doing so, one or more of the UAVs may learn that another one or more UAVs in the WLAN have a version of one or more components of operations configuration data that is better or more appropriate according to some criteria.

In accordance with example embodiments, such criteria may be used by a particular UAV to determine that a particular version of software or other operations configuration in use on the particular UAV should be replaced by a different version in use on a different UAV. The particular UAV may then download the different version from the different UAV and use the download to replace the particular version. Conversely, such criteria may be used by a particular UAV to determine that a particular version of software or other operations configuration in use on the particular UAV should replace a different version in use on a different UAV. The particular UAV may then upload the particular version to the different UAV where it may be used to replace the different version.

Various usage scenarios are possible. For example, a particular UAV may download a version of one particular component of operations configuration data from one UAV and upload a different component to the another UAV. Various criteria may be used to determine when and whether an upload and/or download of versions and/or updates between UAV in a WLAN is appropriate. One form of criteria may include the most recent version. However, most recent may not always be the best or most appropriate criteria. For example, a most recent update of a navigational map may only apply to UAVs using a particular version of software. In some scenarios, the UAV 422 may discover that a different UAV has a particular component of operations configuration data that meets some criteria for replacing its own version, even though the UAV 422 downloaded its version from the operations servers and systems 420.

The above operational examples are just some of the possible usage scenarios of adaptive data distribution via "informed gossip" that may be used among a fleet of UAVs. To the extent that operations configuration data originating from just one or a few downloads from the operations servers and systems 420 via one or a few wireless cellular connection may be distributed among a fleet of UAVs via one or more WLANs, this mode of data distribution may not only be efficient, but may also save significant costs associated with wireless cellular download.

B. Further Example UAV Fleet Support Operations with Specialized UAVs

The data ferry functionality of example specialized UAVs, such as UAVs 422, is just one example of equipping and/or configuring certain UAVs of a fleet or group for specialized functionality in the service of the fleet and/or UAV system. Other non-limiting examples of specialized functionality could include environmental surveying to maintain and/or update site maps, routing maps, and/or terrain and surface-structure maps. For example, new battery charging clusters may be added and/or existing ones modified or removed according to vendor needs. Specialized surveying UAVs could help ensure that locations used by fleet UAVs are up to date. Similarly, specialized survey UAVs could map geological terrain for new flight routes, and/or update surface-structure maps (e.g., "digital surface maps" or DSMs) for the addition and/or removal of man-made structures, such as building or communication towers. Information gathered by specialized surveying UAVs could be used to update navigational maps used by UAVs for flight operations and routing. Distribution of update maps could be accomplished by downloading operations configuration data using one or more data ferry UAV as described above, for example.

Another non-limiting example of specialized functionality could include a battery jumper service in which a specialized "jumper" UAV may travel to a stationary UAV that is in need of battery charging. In an example scenario, the stationary UAV could be visiting a malfunctioning charging cluster. In another example, the stationary UAV could have made an emergency landing due to low battery power. The specialized "jumper" UAV may be equipped with a large battery with sufficient charge to provide battery charging to other UAVs, and thereby provide battery jumper to the stationary UAV, for example.

In some example embodiments, a specialized UAV may establish a WLAN with one or more other UAV while all or some of them are in flight within a region that can be covered by a WLAN access point of the specialized UAV. In such a scenario, an upload and/or download data transfer between the specialized UAV and one or more other UAVs could be carried out while one or more of the specialized UAV and the other UAV(s) are in flight. Such data transfer operations could be opportunistic, such as when a specialized UAV and another UAV happen to fly nearby each other. Additionally or alternatively, such mid-flight data transfers could be scheduled by the UAV system 300, for example, based on predicted or expected routes.

VI. EXAMPLE METHODS

Figure 5:
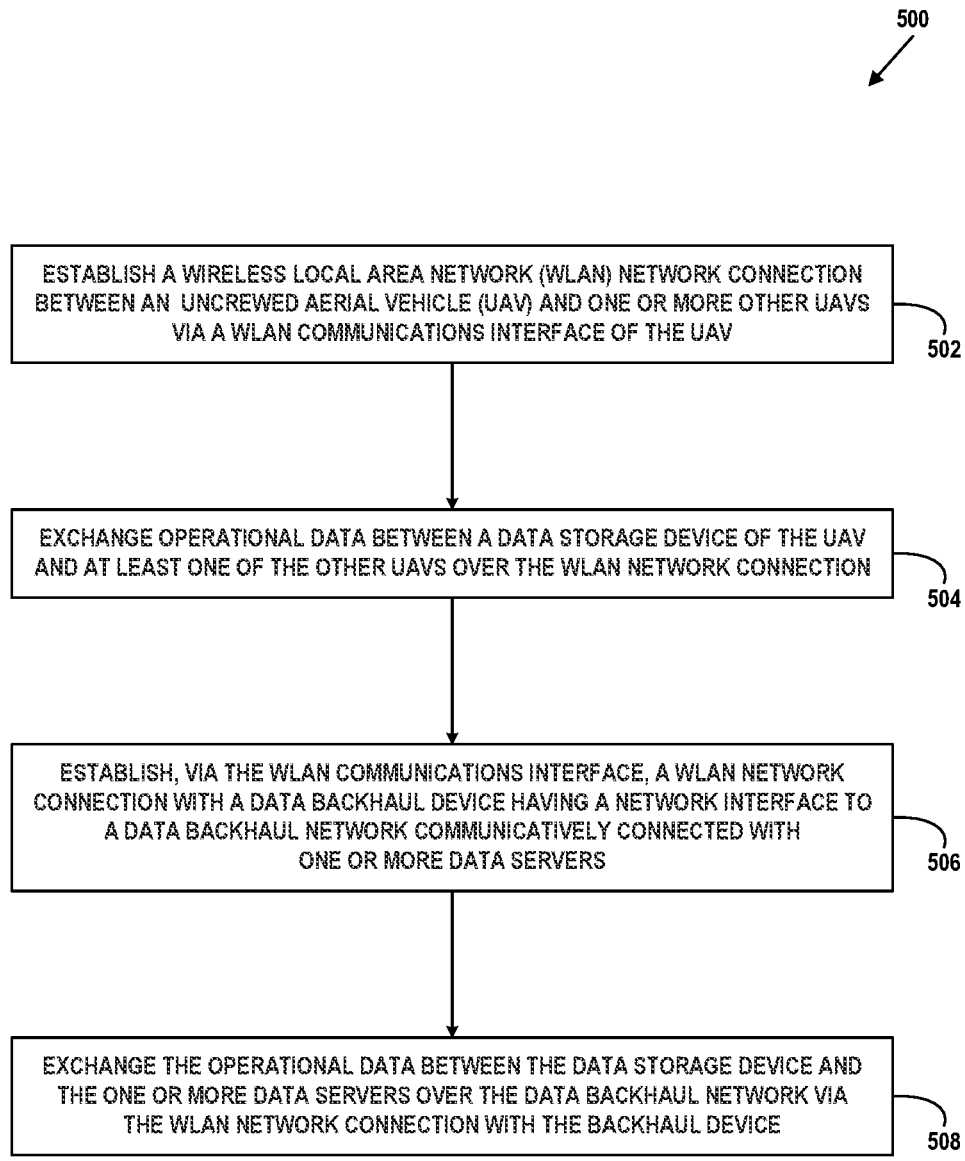
FIG. 5 is a block diagram of an example method, in accordance with example embodiments.
Figure 6:
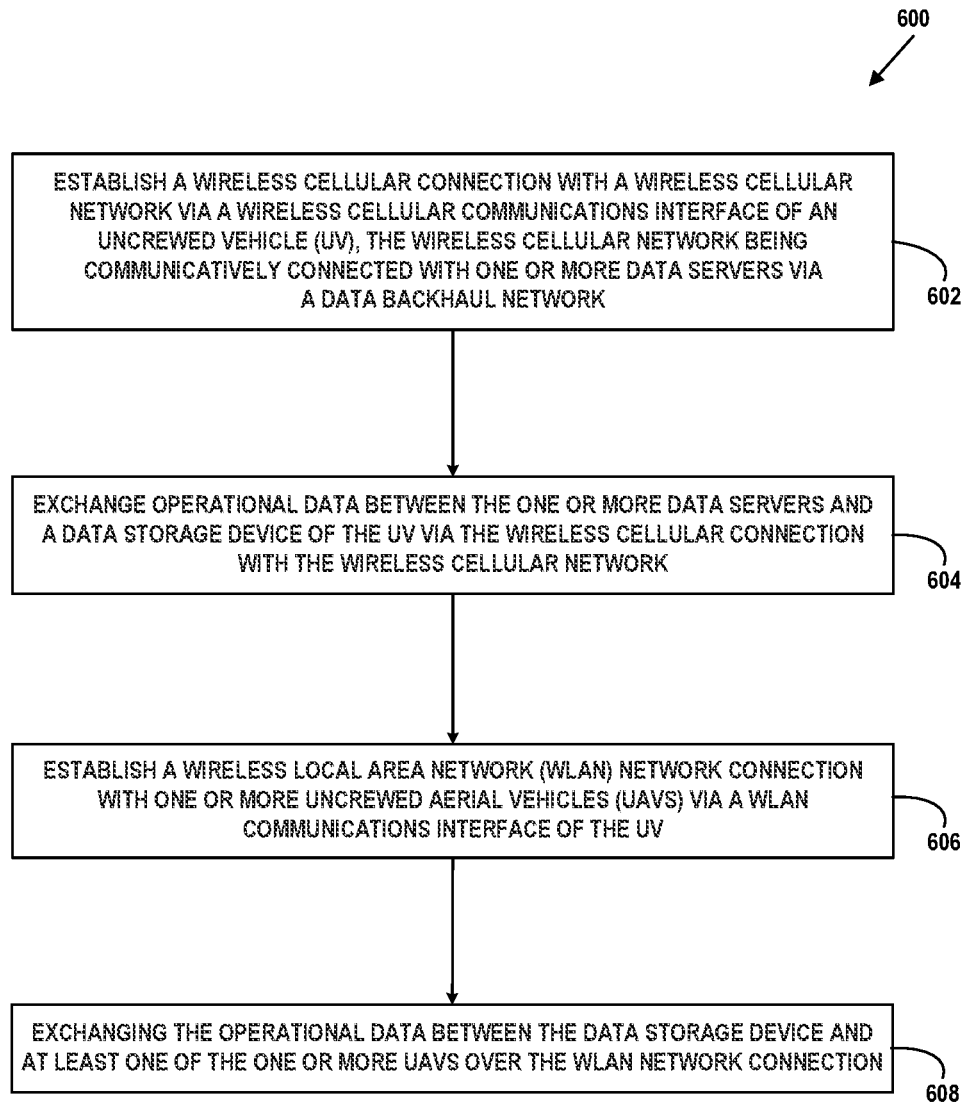
FIG. 6 is a block diagram of another example method, in accordance with example embodiments.

FIGS. 5 and 6 illustrate block diagrams (as flowcharts) of example methods 500 and 600 for various example embodiments described here. More particularly, example method 500, shown in FIG. 5, illustrates an example embodiment of access to and communications with a backhaul data network via a jet bridge, such as regional deployment system 402 of FIGS. 4A-4C. This illustration may correspond to embodiments depicted by way of example in FIG. 4B. Example method 600, shown in FIG. 6, illustrates an example embodiment of access to and communications with a backhaul data network via direct wireless cellular access, corresponding to embodiments depicted by way of example in FIG. 4C. Example method 600 also illustrates aspects of adaptive data distribution modes among groups or fleets of autonomous vehicles. Both example methods are discussed below, with reference to FIGS. 5 and 6.

A. Example Method Using Jet Bridge Access to Backhaul Network

FIG. 5 is a block diagram of method 500, in accordance with example embodiments. Specifically, example method 500 corresponds to example embodiments of access to and communications with a backhaul data network via a jet bridge. In some examples, method 500 may be carried out by a control system. In further examples, method 500 may be carried out by one or more processors, executing program instructions stored in a data storage. Execution of method 500 may involve an uncrewed vehicle, such as a UAV illustrated and described with respect to FIGS. 1-2. Other UAVs, such as a specialized UAV 422 in FIG. 4B, may also be used in the performance of method 500. In further examples, some or all of the blocks of method 500 may be performed by a control system remote from the UAV. In yet further examples, different blocks of method 500 may be performed by different control systems, located on and/or remote from a UAV.

In accordance with example embodiments, example method 500 may be carried out by a control system of a UAV. The UAV may further have or be equipped with a wireless local area network (WLAN) communications interface and a data storage device. The control system may be configured to carry out various operations of the example method 500.

At block 502, method 500 includes establishing a wireless local area network (WLAN) network connection with one or more other UAVs via the WLAN communications interface of the UAV.

At block 504, method 500 includes exchanging operational data between the data storage device of the UAV and at least one of the other UAVs over the WLAN network connection.

At block 506, method 500 includes establishing, via the WLAN communications interface, a WLAN network connection with a data backhaul device having a network interface to a data backhaul network communicatively connected with one or more data servers.

Finally, at block 508, method 500 includes exchanging the operational data between the data storage device and the one or more data servers over the data backhaul network via the WLAN network connection with the backhaul device.

In accordance with example embodiments, the operational data may be or include operations reporting data of the at least one of the one or more other UAVs. In this arrangement, exchanging the operational data between the data storage device of the UAV and the at least one of the other UAVs may involve uploading the operations reporting data from the at least one of the other UAVs to the UAV, and storing the uploaded operations reporting data in the data storage device. Also in this arrangement, exchanging the operational data between the data storage device and the one or more data servers over the data backhaul network may involve uploading the stored operations reporting data from the data storage device to the one or more data servers.

In accordance with example embodiments, the operational data may be or include operations configuration data for the at least one of the one or more other UAVs. In this arrangement, exchanging the operational data between the data storage device of the UAV and the at least one of the other UAVs may involve downloading the operations configuration data from the storage device to the at least one of the one or more other UAVs.

In accordance with example embodiments, exchanging the operational data between the data storage device of the UAV and the at least one of the other UAVs may be carried out while the UAV and the at least one of the one or more other UAVs are each in a non-flying stationary state at a cluster of UAV charging stations at a cluster location. In this arrangement, the method may further involve the UAV flying to the cluster location prior to establishing the WLAN network connection with one or more other UAVs, and may also involve the UAV flying to a backhaul location at which the data backhaul device is located prior to establishing the WLAN network connection with the data backhaul device.

For example embodiments involving operational data that may be or include operations reporting data of the at least one of the one or more other UAVs, the example method 500 may involve further aspects described by way of example below.

After establishing the WLAN network connection with one or more other UAVs, the UAV may upload operations reporting data from each of the other UAVs over the WLAN network connection, and store the uploaded operations reporting data in the data storage device. And after establishing the WLAN network connection with a data backhaul device, the UAV may upload the stored operations reporting data from the data storage device to the one or more data servers over the data backhaul network via the WLAN network connection with the backhaul device.

In accordance with example embodiments, the UAV and the one or more other UAVs may each be in a non-flying stationary state at a first cluster of UAV charging stations at a first cluster location while the operations reporting data are uploaded, and the first cluster location may lack the backhaul data device. In this arrangement, the control system may be further configured to cause the UAV to fly to a backhaul location at which the backhaul data device is located, prior to uploading the stored operations reporting data.

In further accordance with example embodiments, the control system may be further configured to, prior to causing the UAV to fly to the backhaul location, cause the UAV to fly to a different, second cluster of UAV charging stations at a second cluster location at which one or more further UAVs are located, each in a non-flying stationary state. At the second cluster location, the UAV may establish a further WLAN network connection with one or more further UAVs via the WLAN communications interface. Still at the second cluster location, the UAV may upload further operations reporting data from each of the further UAVs over the WLAN network connection, and store the uploaded further operations reporting data in the data storage device with the uploaded operations reporting data. Then, at the backhaul location, the UAV may upload the stored further operations reporting data in addition to the stored operations reporting data.

In accordance with example embodiments, at least one of the one or more other UAVs may include a further data storage device storing further operations reporting data previously uploaded from at least one or more further UAVs. In this arrangement, uploading the operations reporting data from each of the other UAVs over the WLAN network connection may involve uploading the further operations reporting data from the at least one or more further UAVs.

In accordance with example embodiments, the WLAN may be a WIFI network. In this arrangement, the control system may be further configured to cause the WLAN communications interface to operate as a WIFI access point, prior to establishing the WLAN network connection with the one or more other UAVs.

In accordance with example embodiments, access to the WLAN may be restricted to authorized devices. In this arrangement, the UAV and the one or more other UAVs may all be authorized devices. For example, they may all be part of a fleet or group of UAVs.

In accordance with example embodiments, at least the UAV among the UAV and the one or more other UAVs may be a candidate for selection to carry out data transport operations. The data transport operations may include establishing the WLAN network connection with the one or more other UAVs, uploading and storing the operations reporting data, establishing the WLAN network connection with the data backhaul device, and uploading the stored operations reporting data. In this arrangement, selection of a candidate may be based on selection criteria, and the control system may be further configured to determine that the UAV has been selected to carry out the data transport operations.

In accordance with example embodiments, the network interface to the data backhaul network may be a broadband air interface to a radio access network of a wide area cellular network, and/or a landline interface connection to a data communications network.

In accordance with example embodiments, the operations reporting data may be or include respective flight and/or mission operations logs of each of the one or more UAVs.

For example embodiments involving operational data that may be or include operations configuration data for the at least one of the one or more other UAVs, the example method 500 may involve further aspects described by way of example below.

After establishing the WLAN network connection with one or more other UAVs, the UAV downloads operations configuration data from the storage device to each of the other UAVs over the WLAN network connection.

In accordance with example embodiments, the UAV and the one or more other UAVs may each be in a non-flying stationary state at a cluster of UAV charging stations at a cluster location while the operations configuration data are downloaded. In this arrangement, the control system may be further configured to, prior to downloading the operations configuration data to each of the other UAVs, cause the UAV to fly to a backhaul location at which a data backhaul device having a network interface to a data backhaul network communicatively connected with one or more data servers is located. The UAV may then establish, via the WLAN communications interface, a WLAN network connection with a data backhaul device having a network interface to a data backhaul network communicatively connected with one or more data servers. The UAV may download the operations configuration data to the data storage device from the one or more data servers over the data backhaul network via the WLAN network connection with the backhaul device.

In accordance with example embodiments, the WLAN may be a WIFI network. In this arrangement, the control system may be further configured to cause the WLAN communications interface to operate as a WIFI access point, prior to establishing the WLAN network connection with the one or more other UAVs.

In accordance with example embodiments, access to the WLAN may be restricted to authorized devices. In this arrangement, the UAV and the one or more other UAVs may all be authorized devices. For example, they may all be part of a fleet or group of UAVs.

In accordance with example embodiments, the operations configuration data may be software updates, machine learning models, navigational data updates, and/or mission specifications.

In some examples, a non-transitory computer readable medium may include program instructions executable by one or more processors to perform operations. The operations may include the steps of method 500.

B. Example Method Using Direct Wireless Cellular Access to Backhaul Network

FIG. 6 is a block diagram of another method 600, in accordance with example embodiments. Specifically, example method 600 corresponds to example embodiments of access to and communications with a backhaul data network via direct wireless cellular access. In some examples, method 600 may be carried out by a control system. In further examples, method 600 may be carried out by one or more processors, executing program instructions stored in a data storage. Execution of method 600 may involve an uncrewed vehicle (UV). The UV may be a UAV, such as the UAV illustrated and described with respect to FIGS. 1-2, but other forms of UVs, such as land-based UVs may carry out the example method 600. In some examples a UAV, such as a specialized UAV 422 in FIG. 4C, may also be used in the performance of method 600. In further examples, some or all of the blocks of method 600 may be performed by a control system remote from the UV. In yet further examples, different blocks of method 600 may be performed by different control systems, located on and/or remote from a UV.

In accordance with example embodiments, example method 600 may be carried out by a control system of a UV. The UV may also have or be equipped with a wireless local area network (WLAN) communications interface, and further, the UV may also have a wireless cellular communications interface and a data storage device. The control system may be configured to carry out various operations of the example method 600.

At block 602, method 600 includes the UV establishing a wireless cellular connection with a wireless cellular network via a wireless cellular communications interface of the UV. The wireless cellular network may be communicatively connected with one or more data servers via a data backhaul network.

At block 604, method 600 includes the UV exchanging operational data between the one or more data servers and a data storage device of the UV via the wireless cellular connection with the wireless cellular network.

At block 606, method 600 includes the UV establishing a wireless local area network (WLAN) network connection with one or more uncrewed aerial vehicles (UAVs) via a WLAN communications interface of the UV.

Finally, at block 608, method 600 includes the UV exchanging the operational data between the data storage device and at least one of the one or more UAVs over the WLAN network connection.

In accordance with example embodiments, the UV of example method 600 may be UV an uncrewed aerial vehicle (UAV), or a land-based uncrewed vehicle.

In accordance with example embodiments, the WLAN may be a WIFI network, and the control system may be further configured to cause the WLAN communications interface to operate as a WIFI access point prior to establishing the WLAN network connection with the one or more UAVs.

In accordance with example embodiments access to the WLAN may be restricted to authorized devices. With this arrangement, the UV and the one or more UAVs may all be authorized devices.

In accordance with example embodiments, the UV and the one or more UAVs may each be in a non-flying stationary state at a cluster of UAV charging stations at a cluster location while the operational data are exchanged between the data storage device and at least one of the one or more UAVs. The control system may then be further configured to cause the UV to travel to the cluster location prior to establishing the WLAN network connection with the one or more UAVs via the WLAN communications interface. In an example, the UV may be caused to travel to the cluster location in response to a predetermined schedule, an instruction from a server connected to the data backhaul network, or a navigation itinerary.

In accordance with example embodiments, the operational data may comprise operations configuration data for the at least one of the one or more UAVs. With this arrangement, exchanging the operational data between the data storage device of the UV and the at least one of the one or more UAVs may involve downloading the operations configuration data from the storage device to the at least one of the one or more UAVs.

In further accordance with example embodiments, the operations configuration data may comprise a particular version of UV operations configuration data. In this arrangement, example method 600 may further involve making a determination that the particular version satisfies criteria for replacing a different version of the UV operations configuration data currently being used by the at least one of the one or more UAVs. The determination may be made through communicating with the at least one of the one or more UAVs over the WLAN network connection. Then, downloading the operations configuration data from the storage device to the at least one of the one or more UAVs may involve downloading the particular version of UV operations configuration data from the storage device to the at least one of the one or more UAVs based on the determination.

In further accordance with example embodiments, example method 600 may still further involve making a determination that the particular UAV is currently using a particular version of UV operations configuration data that satisfies criteria for replacing a different version of the UV operations configuration data currently being used by the UV. Again, the determination may be made through communicating with a particular UAV of the one or more UAVs over the WLAN network connection. Then, once more, based on the determination, the particular version may be uploaded from the particular UAV over the WLAN network connection, and the different version may be replaced with the uploaded particular version.

In accordance with example embodiments, the control system may be further configured to make a determination that the particular UAV is currently using a particular version of UV operations configuration data that satisfies criteria for replacing a different version of the UV operations configuration data currently being used by the UV. Again, the determination may be made through communicating with a particular UAV of the one or more UAVs over the WLAN network connection. Then, based on the determination, the particular version may be uploaded from the particular UAV over the WLAN network connection, and the different version replaced with the uploaded particular version.

In accordance with example embodiments, the operational data may comprise operations reporting data of the at least one of the one or more UAVs. With this arrangement, exchanging the operational data between the data storage device of the UV and the at least one of the one or more UAVs may involve uploading the operations reporting data from the at least one of the one or more UAVs to the UV, and storing the uploaded operations reporting data in the data storage device. Then, exchanging the operational data between the data storage device and the one or more data servers via the wireless cellular connection with the wireless cellular network may involve uploading the stored operations reporting data from the data storage device to the one or more data servers.

In accordance with example embodiments, among the UV and the one or more UAVs, at least the UV may be a candidate for selection to carry out data transport operations including: establishing the wireless cellular connection with the wireless cellular network via the wireless cellular communications interface, exchanging the operational data between the one or more data servers and the data storage device, establishing the WLAN network connection with the one or more UAVs, and exchanging the operational data between the data storage device and at least one of the one or more UAVs over the WLAN network connection. In this arrangement, selection of a candidate may be based on an instruction from a server connected to the data backhaul network, selection criteria, and/or an election process among the UV and at least one of the one or more UAVs. The control system may then be further configured to make a determination that the UV has been selected to carry out the data transport operations.

In a different example method, similar to example method 600, an uncrewed vehicle (UV), may include a wireless local area network (WLAN) communications interface, and a control system. The control system may be configured to establish a WLAN network connection with one or more other UVs via the WLAN communications interface, and exchange UV operations configuration data with at least one of the one or more other UVs over the WLAN network connection.

In accordance with example embodiments, the control system may be further configured to make a determination that the UV is currently using a particular version of UV operations configuration data that satisfies criteria for replacing a different version of the UV operations configuration data currently being used by the particular UV. The determination may be made through communicating with a particular UV of the one or more other UVs over the WLAN network connection. In this arrangement, exchanging UV operations configuration data with the at least one of the one or more other UVs over the WLAN network connection may involve based on the determination, downloading, to the particular UV the particular version from the UV over the WLAN network connection for replacing the different version with the downloaded particular version.

In accordance with example embodiments, the control system may be further configured to make a determination that the particular UV is currently using a particular version of UV operations configuration data that satisfies criteria for replacing a different version of the UV operations configuration data currently being used by the UV. Again, the determination may be made through communicating with a particular UV of the one or more other UVs over the WLAN network connection. In this arrangement, exchanging UV operations configuration data with the at least one of the one or more other UVs over the WLAN network connection may involve based on the determination, uploading the particular version from the particular UV over the WLAN network connection, and replacing the different version with the uploaded particular version.

In accordance with example embodiments, the control system may be further configured to establish a WLAN network connection with a different particular UV via the WLAN communications interface, and then make a different determination that the uploaded particular version of UV operations configuration data satisfies criteria for replacing a different particular version of the UV operations configuration data currently being used by the different particular UV. Once more, the determination may be made through communicating with the different particular UV over the WLAN network connection. In this arrangement, based on the different determination, the particular version from the UV may be downloaded to the different particular UV over the WLAN network connection, and the different particular version may be replaced with the downloaded particular version.

In some examples, a non-transitory computer readable medium may include program instructions executable by one or more processors to perform operations. The operations may include the steps of method 600.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An uncrewed vehicle (UV), comprising:
a wireless local area network (WLAN) communications interface;
a wireless cellular communications interface;
a data storage device; and
a control system configured to:
establish a WLAN network connection with a second UV via the WLAN communications interface;
exchange operational data between the data storage device and the second UV over the WLAN network connection, wherein the operational data comprise operations reporting data of the second UV, and wherein exchanging the operational data between the data storage device and the second UV comprises: (i) receiving the operations reporting data from the second UV via the WLAN network connection and (ii) storing the operations reporting data in the data storage device;
establish a wireless cellular connection with a wireless cellular network via the wireless cellular communications interface, wherein the wireless cellular network is communicatively connected with a data server via a data backhaul network; and
exchange the operational data between the data server and the data storage device via the wireless cellular connection, wherein exchanging the operational data between the data server and the data storage device comprises uploading the operations reporting data from the data storage device to the data server.

2. The UV of claim 1, wherein the UV is one of an uncrewed aerial vehicle or a land-based uncrewed vehicle.

3. The UV of claim 1, wherein the WLAN is a WIFI network, and wherein the control system is further configured to:
prior to establishing the WLAN network connection with the second UV, cause the WLAN communications interface to operate as a WIFI access point.

4. The UV of claim 1, wherein access to the WLAN is restricted to authorized devices, and wherein the second UV is an authorized device.

5. The UV of claim 1, wherein the UV and the second UV are each in a non-flying stationary state at a cluster of UV charging stations at a cluster location while the operational data are exchanged between the data storage device and the second UV, and wherein the control system is further configured to:
prior to establishing the WLAN network connection with the second UV via the WLAN communications interface, cause the UV to travel to the cluster location in response to one or more of: a predetermined schedule, an instruction from a server connected to the data backhaul network, or a navigation itinerary.

6. The UV of claim 1, wherein the operational data comprise operations configuration data for the second UV, and wherein exchanging the operational data between the data storage device and the second UV comprises transmitting the operations configuration data from the data storage device to the second UV.

7. The UV of claim 6, wherein the operations configuration data comprise a first version of UV operations configuration data, and wherein the control system is further configured to:
through communicating with the second UV over the WLAN network connection, determine that the first version satisfies criteria for replacing a second version of the UV operations configuration data currently being used by the second UV, wherein transmitting the operations configuration data from the data storage device to the second UV comprises:
transmitting the first version of the UV operations configuration data from the data storage device to the second UV based on determining that the first version satisfies the criteria for replacing the second version of the UV operations configuration data.

8. The UV of claim 6, wherein the control system is further configured to:

through communicating with the second UV over the WLAN network connection, determine that the second UV is currently using a first version of UV operations configuration data that satisfies criteria for replacing a second version of the UV operations configuration data currently being used by the UV; and based on determining that the second UV is currently using the first version of the UV operations configuration data that satisfies the criteria for replacing the second version of the UV operations configuration data, receive the first version from the second UV over the WLAN network connection and replace the second version with the first version.

9. The UV of claim 6, wherein the operations configuration data comprise at least one of: a software update, a machine learning model, a navigational data update, or a mission specification.

10. The UV of claim 1, wherein;
among the UV and the second UV, at least the UV is a candidate for selection to carry out data transport operations including:
establishing the wireless cellular connection with the wireless cellular network via the wireless cellular communications interface, exchanging the operational data between the data server and the data storage device, establishing the WLAN network connection with the second UV, and exchanging the operational data between the data storage device and the second UV over the WLAN network connection,
selection of a candidate is based on at least one of: an instruction from a server connected to the data backhaul network, selection criteria, or an election process among the UV and the second UV, and
the control system is further configured to determine that the UV has been selected to carry out the data transport operations.

11. An uncrewed vehicle (UV), comprising:
a wireless local area network (WLAN) communications interface; and
a control system configured to:
establish a WLAN network connection with one or more other UVs via the WLAN communications interface;
exchange UV operations configuration data with a second UV one or more other UVs over the WLAN network connection;
through communicating with the second UV over the WLAN network connection, determine that the UV is currently using a first version of the UV operations configuration data that satisfies criteria for replacing a second version of the UV operations configuration data currently being used by the second UV; and
based on determining that the UV is currently using the first version of the UV operations configuration data that satisfies the criteria for replacing the second version of the UV operations configuration data, transmit, over the WLAN network connection, the first version of the UV operations configuration data to the second UV for replacing the second version with the first version.

12. The UV of claim 11, wherein the one or more other UVs comprise a plurality of other UVs, and wherein the control system is further configured to:
through communicating with a third UV of the plurality of other UVs over the WLAN network connection, determine that the third UV is currently using a third version of the UV operations configuration data that satisfies criteria for replacing the first version of the UV operations configuration data currently being used by the UV; and
based on determining that the third UV is currently using the third version of the UV operations configuration data that satisfies the criteria for replacing the first version of the UV operations configuration data, receiving, over the WLAN network connection, the third version of the UV operations configuration data from the third UV and replacing the first version with the third version.

13. The UV of claim 12, wherein the control system is further configured to:
establish a WLAN network connection with a fourth UV of the plurality of other UVs via the WLAN communications interface;
through communicating with the fourth UV over the WLAN network connection, determine that the third version of the UV operations configuration data satisfies criteria for replacing a fourth version of the UV operations configuration data currently being used by the fourth UV; and
based on determining that the third version of the UV operations configuration data satisfies the criteria for replacing the fourth version of the UV operations configuration data, transmit, over the WLAN network connection, the third version to the fourth UV from the UV for replacing the fourth version with the third version.

14. The UV of claim 11, wherein the control system is further configured to:
before communicating with the second UV over the WLAN network connection, establish a connection with a data server via a data backhaul network; and
obtain the first version of UV operations configuration data from the data server.

15. A method carried out by an uncrewed vehicle (UV), the method comprising:
establishing a wireless local area network (WLAN) network connection with a second UV via a WLAN communications interface of the UV;
exchanging operational data between a data storage device of the UV and the second UV over the WLAN network connection, wherein the operational data comprise operations reporting data of the second UV, and wherein exchanging the operational data between the data storage device and the second UV comprises: (i) receiving the operations reporting data from the second UV via the WLAN network connection and (ii) storing the operations reporting data in the data storage device;
establishing a wireless cellular connection with a wireless cellular network via a wireless cellular communications interface of the UV, wherein the wireless cellular network is communicatively connected with a data server via a data backhaul network; and
exchanging the operational data between the data server and the data storage device via the wireless cellular connection, wherein exchanging the operational data between the data server and the data storage device comprises uploading the operations reporting data from the data storage device to the data server.

16. The method of claim 15, wherein the operational data comprise operations configuration data for the second UV, and wherein exchanging the operational data between the data storage device and the second UV comprises transmitting the operations configuration data from the data storage device to the second UV.

17. The method of claim 16, wherein the operations configuration data comprise a first version of UV operations configuration data, and wherein the method further comprises:
   through communicating with the second UV over the WLAN network connection, determining that the first version satisfies criteria for replacing a second version of the UV operations configuration data currently being used by the second UV, wherein transmitting the operations configuration data from the data storage device to the second UV comprises:
      transmitting the first version of the UV operations configuration data from the data storage device to the second UV based on determining that the first version satisfies the criteria for replacing the second version of the UV operations configuration data.

18. The method of claim 16, wherein the method further comprises:
   through communicating with the second UV over the WLAN network connection, determine that the second UV is currently using a first version of UV operations configuration data that satisfies criteria for replacing a second version of the UV operations configuration data currently being used by the UV; and
   based on determining that the second UV is currently using the first version of the UV operations configuration data that satisfies the criteria for replacing the second version of the UV operations configuration data, receiving the first version from the second UV over the WLAN network connection and replacing the second version with the first version.

19. The method of claim 16, wherein the operations configuration data comprise a machine learning model.

20. The method of claim 16, wherein the operations configuration data comprise a navigational data update.

* * * * *